US012545559B2

(12) United States Patent
Nakatsuka et al.

(10) Patent No.: US 12,545,559 B2
(45) Date of Patent: Feb. 10, 2026

(54) BACKSTOP

(71) Applicant: KOBELCO CONSTRUCTION MACHINERY CO., LTD., Hiroshima (JP)

(72) Inventors: Kenichi Nakatsuka, Hyogo (JP); Koji Sumimoto, Hyogo (JP); Eiji Miya, Hyogo (JP); Teppei Maedo, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 252 days.

(21) Appl. No.: 18/568,878

(22) PCT Filed: Feb. 10, 2022

(86) PCT No.: PCT/JP2022/005333

§ 371 (c)(1),
(2) Date: Dec. 11, 2023

(87) PCT Pub. No.: WO2022/264497

PCT Pub. Date: Dec. 22, 2022

(65) Prior Publication Data

US 2024/0270542 A1 Aug. 15, 2024

(30) Foreign Application Priority Data

Jun. 14, 2021 (JP) ................................ 2021-098925

(51) Int. Cl.
*B66C 23/92* (2006.01)
*B66C 23/36* (2006.01)

(52) U.S. Cl.
CPC .............. *B66C 23/92* (2013.01); *B66C 23/36* (2013.01)

(58) Field of Classification Search
CPC ..... B66C 23/92; B66C 23/821; B66C 23/823; B66C 23/825; B66C 23/826; B66C 23/828
See application file for complete search history.

(56) References Cited

U.S. PATENT DOCUMENTS

2019/0106304 A1* 4/2019 Lissandre .............. B66C 23/62
2019/0106305 A1* 4/2019 Raymond .............. B66C 23/26
2021/0206606 A1 7/2021 Aitken et al.

FOREIGN PATENT DOCUMENTS

JP 2009-280344 A 12/2009
JP 2011-26132 A 2/2011
(Continued)

OTHER PUBLICATIONS

JP 2009/280344A Machine Translation (Year: 2009).*
(Continued)

*Primary Examiner* — Anna M Momper
*Assistant Examiner* — Juan J Campos, Jr.
(74) *Attorney, Agent, or Firm* — Oblon, McClelland, Maier & Neustadt, L.L.P.

(57) ABSTRACT

A backstop to prevent contact between a spacer and a peripheral member includes a rear jib backstop for a crane, having an outer cylinder, an inner cylinder, a spacer, a spacer holder and a lock mechanism. The spacer holder supports the spacer pivotally and swingably about an axis thereof and allows the spacer to fit on the inner cylinder, to keep the rear jib backstop from contracting in accordance with a change in a posture of the rear jib backstop when a boom rises. The lock mechanism enables locking of the spacer in such a manner as to keep the spacer from swinging about a swing central axis in a state where the spacer is located away from an outer surface of the inner cylinder.

6 Claims, 22 Drawing Sheets

(56) References Cited

FOREIGN PATENT DOCUMENTS

| | | | | | |
|---|---|---|---|---|---|
| JP | 5870885 | B2 | * | 3/2016 | |
| JP | 2017-137163 | A | | 8/2017 | |
| JP | 2017-137164 | A | | 8/2017 | |
| JP | 2018048014 | A | * | 3/2018 | |
| JP | 2018048015 | A | * | 3/2018 | |
| JP | 2018-52723 | A | | 4/2018 | |
| JP | 2020152501 | A | * | 9/2020 | |
| WO | WO-2016092923 | A1 | * | 6/2016 | ............. B66C 23/42 |

OTHER PUBLICATIONS

International Search Report issued May 17, 2022 in PCT/JP2022/005333 filed on Feb. 10, 2022 citing documents 1, 15-19 therein, 2 pages.

* cited by examiner

BACKSTOP

TECHNICAL FIELD

The present invention relates to a backstop to be attached to a crane.

BACKGROUND ART

Patent Literature 1 discloses a crane including: a crane main body; a boom supported on the crane main body rotatably in a tilting direction; a jib supported at a distal end of the boom rotatably in the tilting direction; a strut supported at a proximal end of the jib and in the rear of the jib rotatably in the tilting direction for supporting the jib from the rear thereof. The crane further includes a jib backstop to prevent the strut and the jib from falling rearward with respect to the boom.

The jib backstop includes an outer cylinder, an inner cylinder movable relative to the outer cylinder in an axial direction, and a spacer. The movement of the inner cylinder relative to the outer cylinder makes the jib backstop extend and contract. The outer cylinder has a proximal end rotatably supported by the strut, and the inner cylinder has a distal end rotatably supported at the distal end of the boom. The spacer has a shape fittable on an outer surface of the inner cylinder, and is rotatably supported at a distal end of the outer cylinder. When the boom and the jib rise with respect to the crane main body in assembling of the crane, a posture of the jib backstop changes in conjunction with the rising, and the spacer fits on the outer surface of the inner cylinder to prevent the jib backstop from further contracting. As a result, the jib backstop supports the strut from the rear thereof to keep the strut and the jib from further rotating, that is, to prevent the strut and the jib from falling rearward.

CITATION LIST

Patent Literature

Patent Literature 1: Japanese Unexamined Patent Publication No. 2009-280344

The technology described in Patent Literature 1 has drawbacks that the spacer may be damaged by rotating and coming into contact with a peripheral member when the spacer receives vibration or impact in disassembling or transportation of the crane, and thus faces difficulty in stably supporting the strut by the backstop in working of the crane.

SUMMARY OF INVENTION

The present invention has an object of providing a backstop that attains prevention from contact between a spacer and a peripheral member in disassembling of a crane.

The present invention provides a backstop that is to be attached to a crane including a machine body, a boom tiltably supported on the machine body, and a strut, the backstop being located between the boom and the strut for supporting the strut. The boom includes a boom proximal end and a boom distal end. The boom proximal end is rotatably attached to the machine body. The boom distal end is located opposite the boom proximal end and has a strut supporting part and a backstop supporting part located in the rear of the strut supporting part. The strut includes a strut proximal end, a strut distal end, and a backstop connection part. The strut proximal end is supported rotatably in a tilting direction about a reference rotation central axis extending horizontally by the strut supporting part at the boom distal end. The strut distal end is located opposite the strut proximal end. The backstop connection part is located between the strut proximal end and the strut distal end. The backstop includes an outer cylinder, an inner cylinder, a spacer, a spacer holder, and a lock mechanism. The outer cylinder includes an outer cylinder proximal end to be connected to the backstop connection part of the strut rotatably about a first rotation central axis being parallel to the reference rotation central axis, and an outer cylinder distal end located opposite the outer cylinder proximal end. The inner cylinder includes an inner cylinder proximal end to be supported by the backstop supporting part at the boom distal end rotatably about a second rotation central axis being parallel to the reference rotation central axis, and an inner cylinder distal end located opposite the inner cylinder proximal end to extend in the outer cylinder through the outer cylinder proximal end. The inner cylinder is movable relative to the outer cylinder in an axial direction to permit a change in a distance between the backstop supporting part and the backstop connection part in accordance with a rotation of the strut about the reference rotation central axis to the boom. The spacer has a predetermined dimension in the axial direction and a semi-cylindrical inner surface fittable on an outer surface of the inner cylinder in a direction perpendicularly intersecting the axial direction. The spacer has opposite ends in the axial direction respectively coming into contact with the outer cylinder distal end and the inner cylinder proximal end to keep the backstop from contracting in such a manner that the outer cylinder distal end comes closer to the inner cylinder proximal end than a distance corresponding to the dimension. The spacer holder is attached to the outer cylinder of the backstop for supporting the spacer swingably about a swing central axis perpendicularly intersecting the axial direction. The spacer holder supports the spacer in such a manner that the spacer swings about the swing central axis under the weight of the spacer to fit on the inner cylinder when the boom rises with respect to the machine body while supporting the strut. The lock mechanism is shiftable between a locking state and an unlocking state. The locking state is a state of locking the spacer to keep the spacer from swinging about the swing central axis in a state where the spacer is located away from the outer surface of the inner cylinder, and the unlocking state is a state of permitting the spacer to swing about the swing central axis.

DESCRIPTION OF EMBODIMENTS

Figure 1:
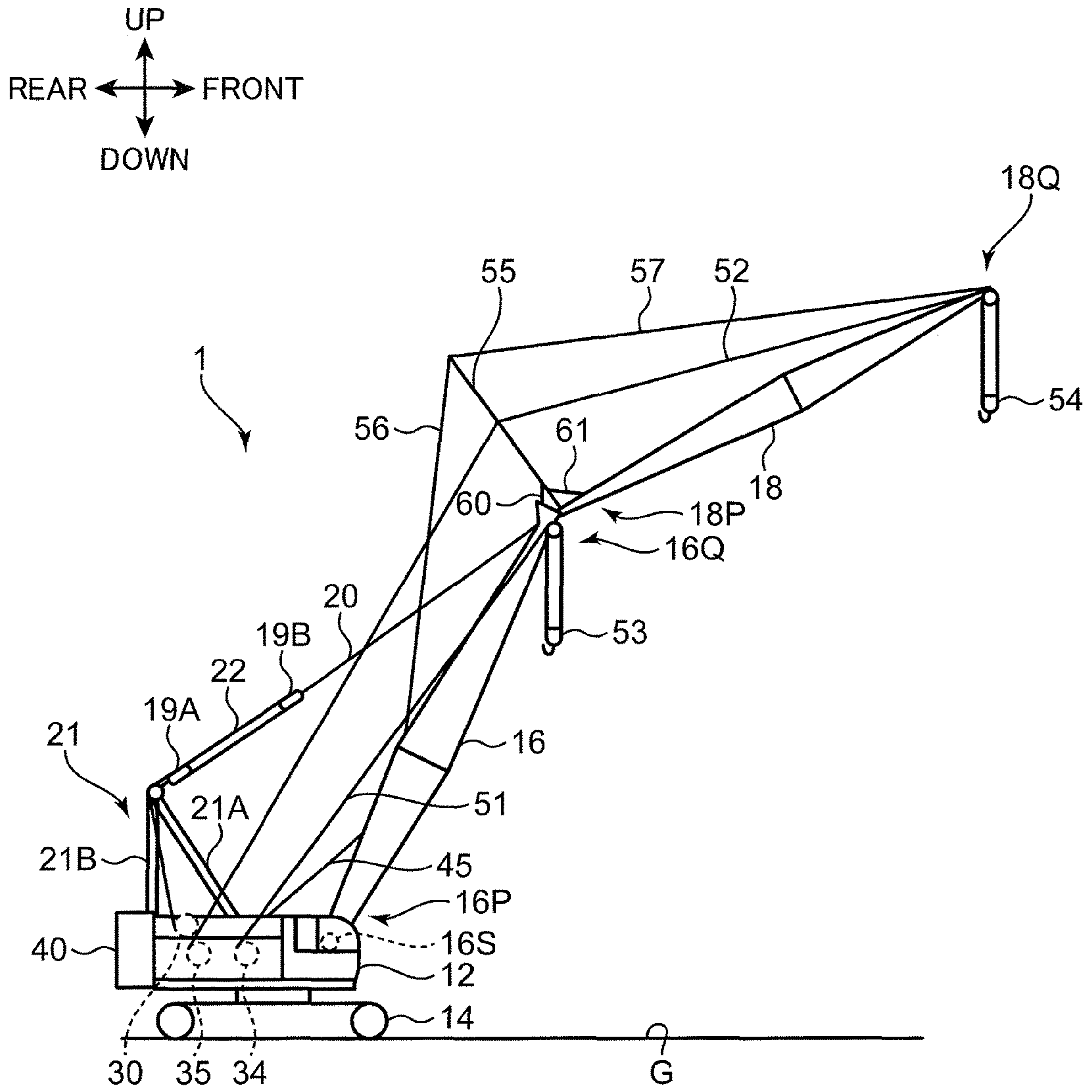
FIG. 1 is a side view of a crane in an embodiment of the present invention.

Hereinafter, an embodiment of the present invention will be described with reference to the accompanying drawings. FIG. 1 is a side view of a crane 1 or working machine in an embodiment of the present invention. Hereinafter, although each drawing shows directions “UP”, “DOWN, “LEFT”, “RIGHT”, “FRONT”, and “REAR”, each direction is defined for convenience to explain a structure and an assembling way of the crane 1 in the embodiment, and thus does not delimit any moving direction of the crane and any use way of a backstop in the present invention.

The crane 1 includes an upper slewing body 12, a lower traveling body 14, a boom 16, a jib 18, a lower spreader 19A, an upper spreader 19B, a pair of left and right boom guy lines 20, a gantry 21, a boom raising and lowering rope 22, a boom raising and lowering winch 30, a main winch 34, an auxiliary winch 35, a counterweight 40, and a pair of left and right boom backstops 45. The crane 1 further includes a main rope 51, an auxiliary rope 52, a main hook 53, an auxiliary hook 54, a pair of left and right struts 55, a pair of left and right rear jib guy lines 56, a pair of left and right front jib guy lines 57, a pair of left and right rear jib backstops 60, and a pair of left and right front jib backstops 61. In the description below, concerning each pair of left and right members described above, the left member and the right member have the same structure, and thus, the structure of one of the left and right members will be described.

The upper slewing body 12 constitutes a crane main body or machine body of the crane 1 and is supported on the lower traveling body 14 swingably about a slewing central axis extending in an up-down direction. The lower traveling body 14 is travelable on a traveling surface, for example, on a ground G.

Figure 9:
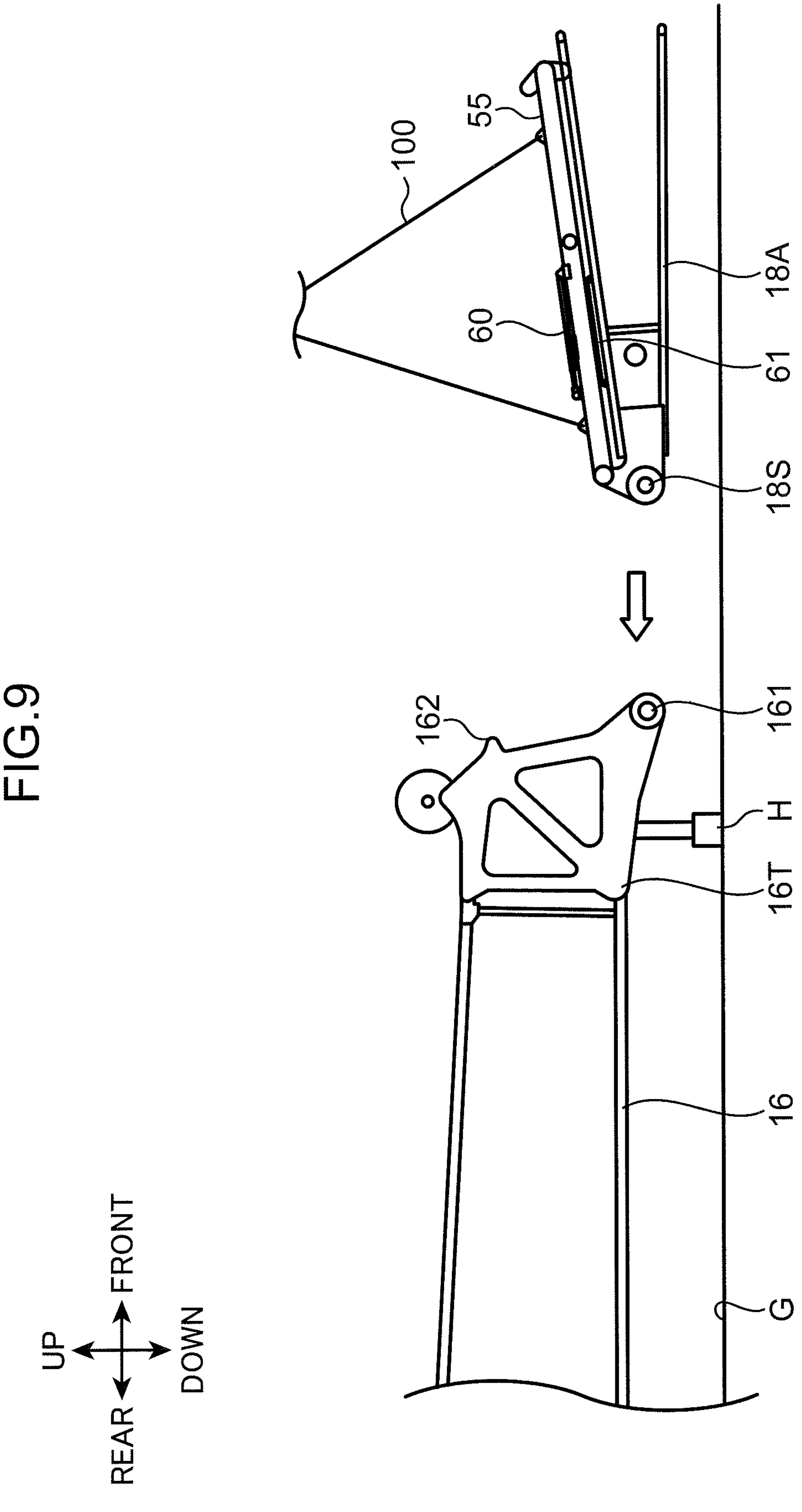
FIG. 9 is a side view of a state of the lower jib and the strut being connected to a boom head of the crane in the embodiment of the present invention.

The boom 16 is tiltably supported on the upper slewing body 12. Specifically, the boom 16 has a boom proximal end 16P and a boom distal end 16Q. The boom proximal end 16P is supported on the upper slewing body 12 rotatably in a tilting direction about a boom rotation central axis extending horizontally. The boom distal end 16Q is located opposite the boom proximal end 16P in a longitudinal direction. In the embodiment, the boom proximal end 16P includes a boom foot 16S rotatably supported by an unillustrated pivotally supporting part of the upper slewing body 12. The boom distal end 16Q has a jib supporting part 161 or strut supporting part to be described later and a backstop supporting part 162 located in the rear of the jib supporting part 161 (FIG. 9). The boom 16 shown in FIG. 1 is of a so-called lattice type, and includes a plurality of boom members connected to each other. The structure of the boom 16 is not limited to this type, and may be a structure of a box type or a structure of an extendable and contractible type. The boom 16 has a back surface supporting the pair of left and right backstops 45 thereon. Each of the backstops 45 comes into contact with the upper slewing body 12 in a rising posture of the boom 16, i.e., a working posture of the crane 1. The contact prevents the boom 16 from being blown rearward by a strong wind or other incident.

The jib 18 is supported rotatably in a tilting direction about a rotation central axis extending horizontally at the boom distal end 16Q of the boom 16. The jib 18 includes a lower jib 18A (FIG. 2) to be described later.

The lower spreader 19A is connected to a distal end of the gantry 21 and has an unillustrated lower sheave block. The lower sheave block includes a plurality of sheaves arrayed in a width direction (left-right direction).

The upper spreader 19B is located at a predetermined forward distance from the lower spreader 19A. The upper spreader 19B is connected to the boom distal end 16Q via the boom guy lines 20. The upper spreader 19B has an unillustrated upper sheave block. The upper sheave block includes a plurality of sheaves arrayed in the width direction (left-right direction).

The boom guy lines 20 are spaced apart from each other in the left-right direction perpendicularly intersecting the paper of FIG. 1. Each boom guy line 20 has a rear end connected to the upper spreader 19B, and each guy line 20 has a front end detachably connected to the boom distal end 16Q. The boom guy line 20 may be in the form of a guy link (metal plate member), a guy rope, a guy wire (metal wire), or any other structure.

The gantry 21 is supported on the upper slewing body 12 in the rear of the boom 16.

As shown in FIG. 1, the gantry 21 includes two structural members of a compression member 21A and a tension member 21B forming a substantially triangular shape in cooperation with the upper slewing body 12. The tension member 21B extends substantially vertically upward from a rear end of the upper slewing body 12. The compression member 21A obliquely connects an upper end of the tension member 21B and a front portion of the upper slewing body 12 to each other. The gantry 21 supports the boom 16 from the rear thereof in such a manner that the boom 16 is tiltable.

The boom raising and lowering rope 22 is drawn out of the boom raising and lowering winch 30, supported on a sheave arranged at a distal end of the tension member 21B, and then looped over the lower sheave block of the lower spreader 19A and the upper sheave block of the upper spreader 19B a plurality of turns. A leading end of the boom raising and lowering rope 22 having been looped over the lower sheave block and the upper sheave block is fixed to the distal end (upper end) of the gantry 21.

The boom raising and lowering winch 30 is arranged on the upper slewing body 12. The boom raising and lowering winch 30 winds up and unwinds the boom raising and lowering rope 22 to change a distance between the lower sheave block of the lower spreader 19A and the upper sheave block of the upper spreader 19B and raise or lower the boom 16 while rotating the boom 16 relative to the gantry 21.

The main winch 34 executes lifting and lowering of a hoisted load by using the main rope 51 (FIG. 1). For the main lifting and lowering, unillustrated main guide sheaves are rotatably provided at the boom distal end 16Q of the boom 16, and a main sheave block including a plurality of main point sheaves arrayed adjacent to the main guide sheaves in the width direction is provided. The main rope 51 extending downward from the main sheave block is connected to the main hook 53 for the hoisted load. The main rope 51 drawn out of the main winch 34 is sequentially supported on the main guide sheaves, and extends over sheaves of the main sheave block and sheaves of a sheave block at the main hook 53 and therebetween. Consequently, winding and unwinding of the main rope 51 by the main winch 34 leads to the lifting and lowering of the main hook 53.

Similarly, the auxiliary winch 35 executes lifting and lowering of a hoisted load by using the auxiliary rope 52. For the auxiliary lifting and lowering, unillustrated auxiliary guide sheaves are rotatably provided at a distal end of the jib 18, and an auxiliary sheave block including a plurality of auxiliary point sheaves arrayed adjacent to the auxiliary guide sheaves in the width direction is provided. The auxiliary rope 52 extending downward from the auxiliary sheave block is connected to the auxiliary hook 54 for the hoisted load. The auxiliary rope 52 drawn out of the auxiliary winch 35 is sequentially supported on the auxiliary guide sheaves via sheaves of the strut 55, and extends over sheaves of the auxiliary sheave block and sheaves of a sheave block at the auxiliary hook 54 and therebetween. Consequently, winding and unwinding of the auxiliary rope 52 by the auxiliary winch 35 leads to lifting and lowering of the auxiliary hook 54 for the hoisted load connected to an extreme end of the auxiliary rope 52.

The counterweight 40 is mounted on a rear portion of the upper slewing body 12 to adjust a balance of the crane 1.

Figure 2:
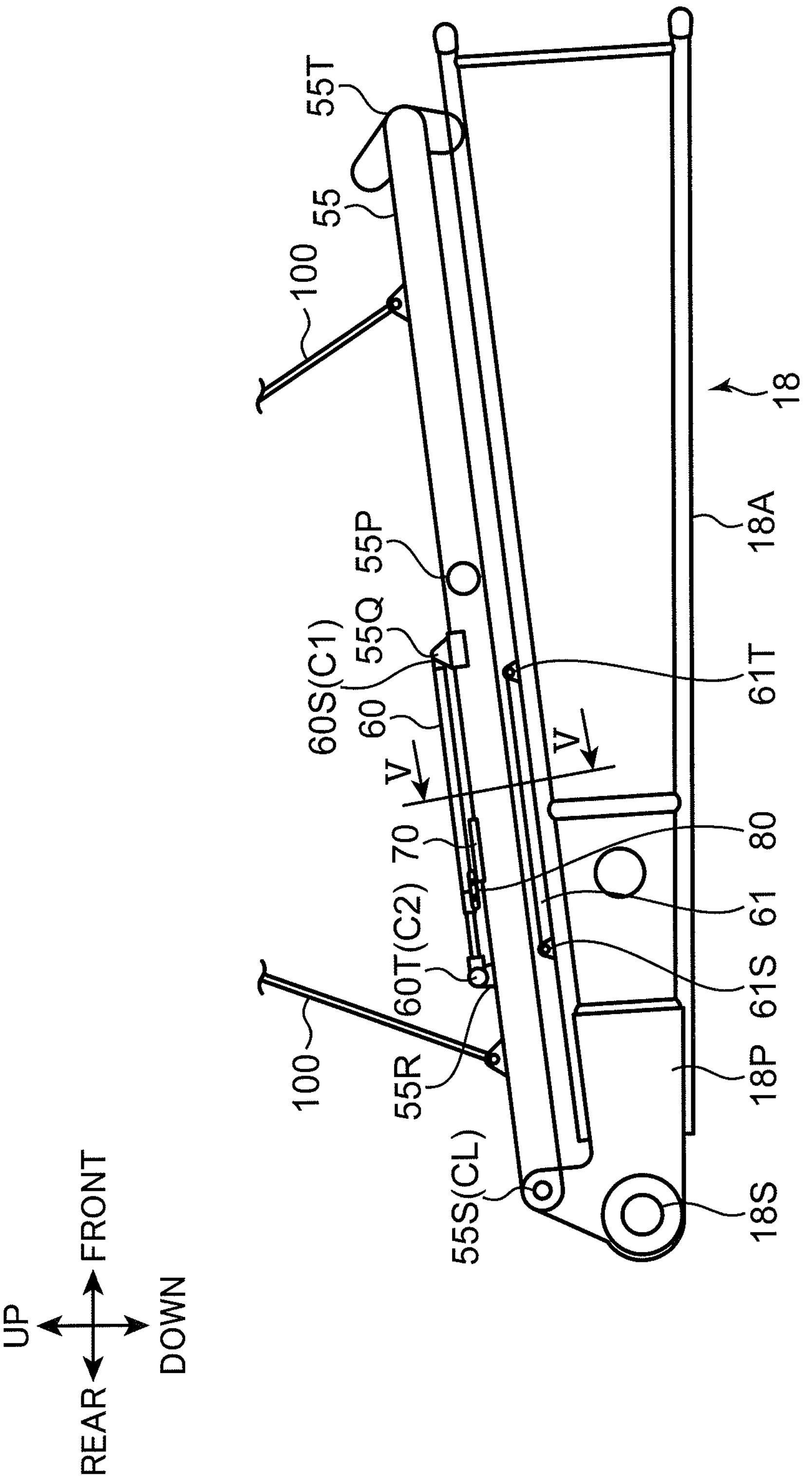
FIG. 2 is a side view of a state where a strut is mounted on a lower jib of the crane in the embodiment of the present invention.
Figure 3:
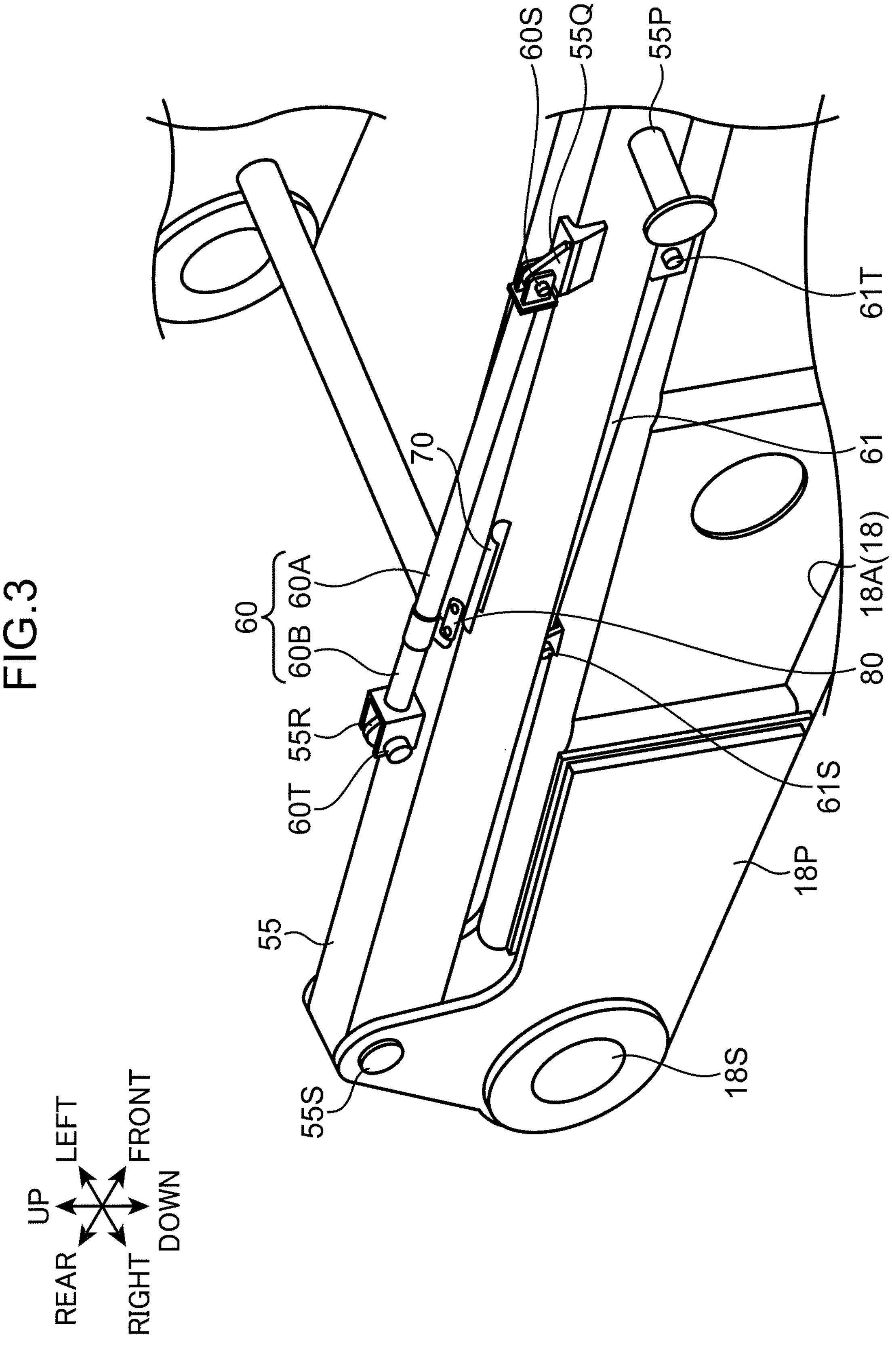
FIG. 3 is an enlarged perspective view of the state where the strut is mounted on the lower jib of the crane in the embodiment of the present invention.

The strut 55 is supported at a jib proximal end 18P of the jib 18 rotatably in a tilting direction (FIG. 2 and FIG. 3). The strut 55 serves as a support member that supports the jib 18 from the rear thereof. The strut 55 has a distal end, i.e., a strut distal end 55T to be described later, connected to a longitudinal middle portion of the boom 16 by the rear jib guy line 56, and connected to a jib distal end 18Q of the jib 18 by the front jib guy line 57.

The rear jib backstop 60 connects the strut 55 and the boom distal end 16Q, i.e., a boom head 16T to be described later, of the boom 16 to each other. In other words, the rear jib backstop 60 is located between the boom 16 and the strut 55 for supporting the strut 55. The front jib backstop 61 connects the strut 55 and the jib 18 to each other. In other words, the front jib backstop 61 is located between the jib 18 and the strut 55 to support the jib 18. As a result, the rear jib backstop 60 and the front jib backstop 61 prevent the strut 55 and the jib 18 from being blown and falling by the wind or other incident in working of the crane 1. Each jib backstop has an extendable and contractible cylinder structure.

Figure 4:
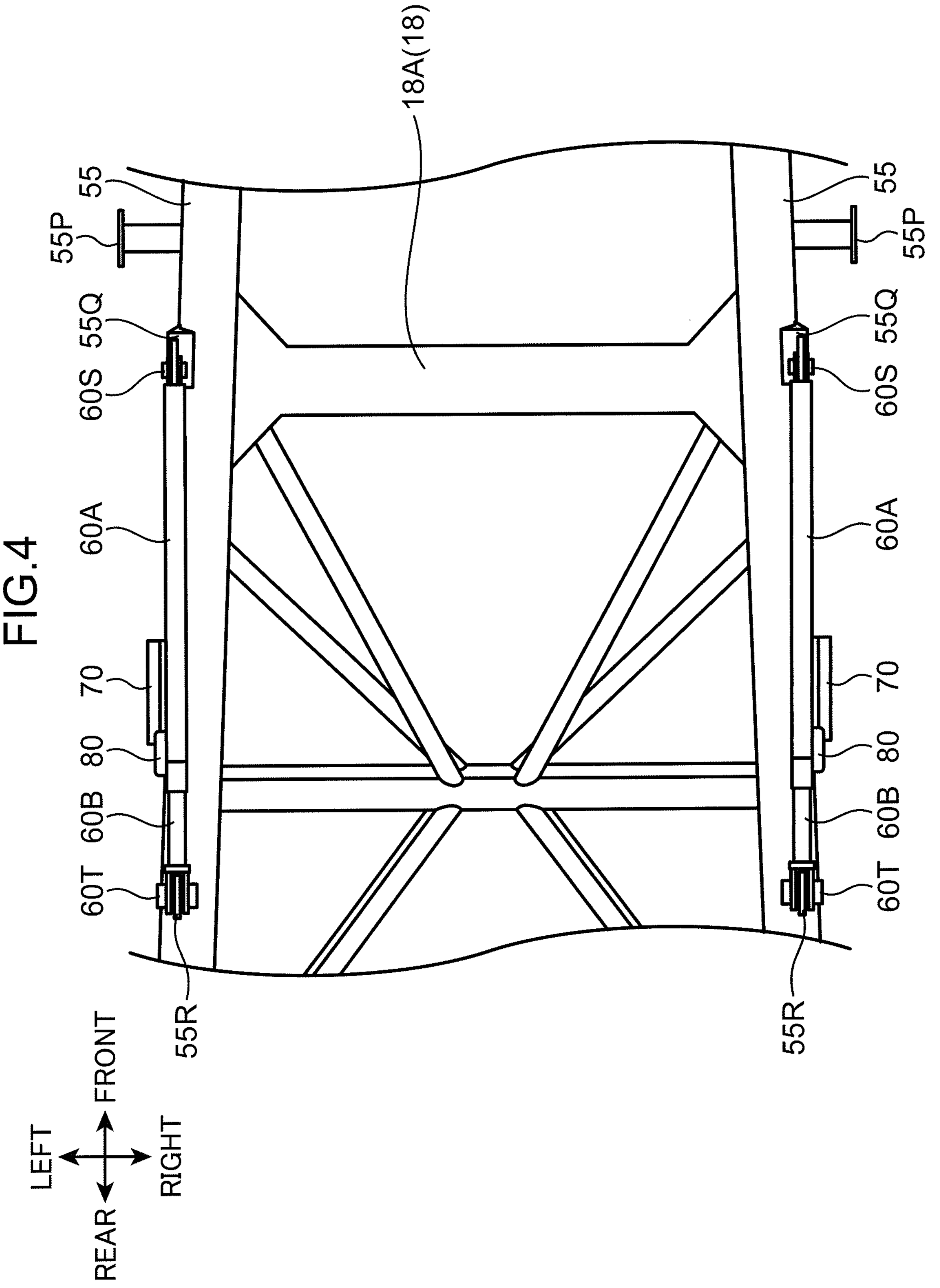
FIG. 4 is an enlarged plan view of the state where the strut is mounted on the lower jib of the crane in the embodiment of the present invention.
Figure 5:
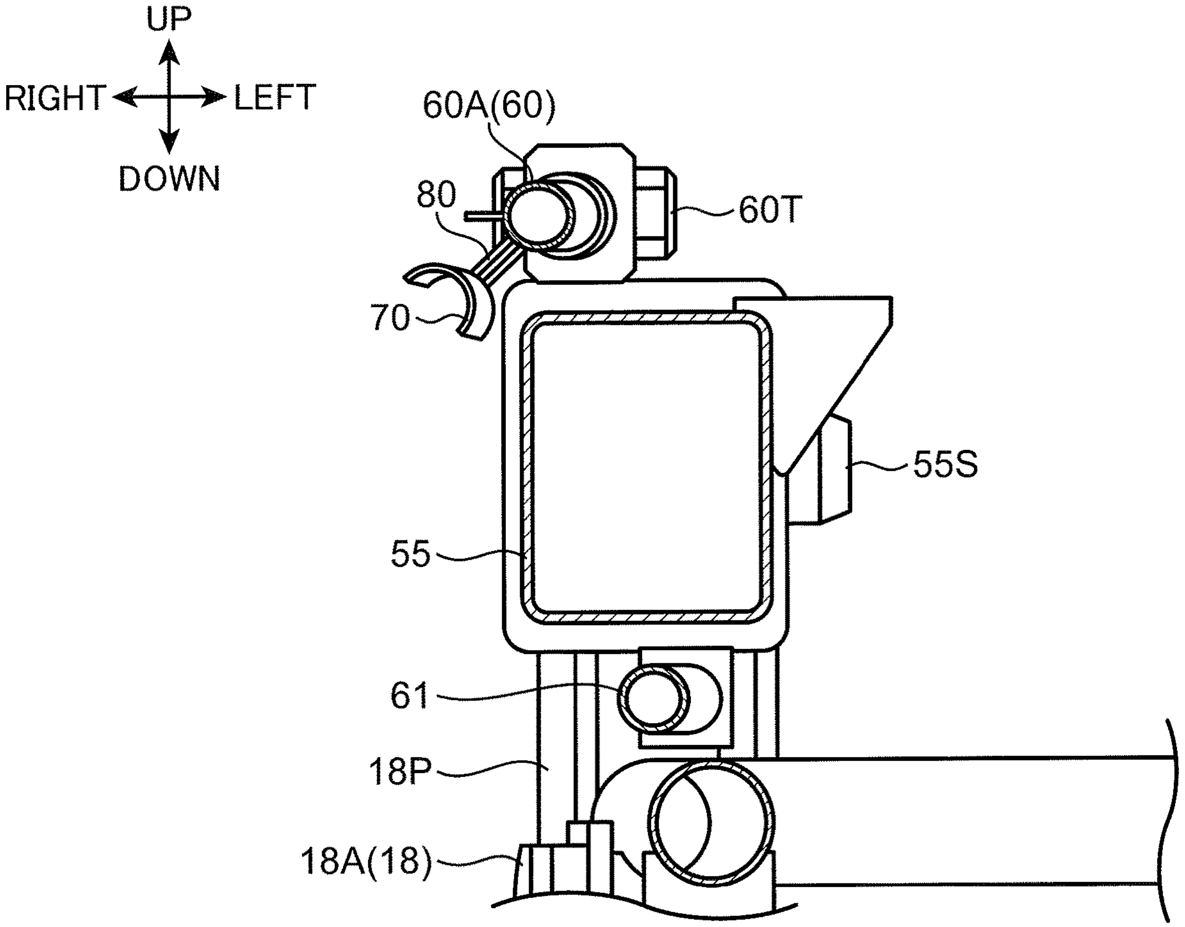
FIG. 5 is an enlarged cross-sectional view of a periphery of the strut in a state where the strut is mounted on the lower jib of the crane in the embodiment of the present invention.

FIG. 2 is a side view and FIG. 3 is an enlarged perspective view, each view showing a state where the strut 55 is mounted on the lower jib 18A of the crane 1 in the embodiment. FIG. 4 is an enlarged plan view and FIG. 5 is an enlarged cross-sectional view, each view showing the state where the strut 55 is mounted on the lower jib 18A of the crane 1 in the embodiment. FIG. 5 is a cross-sectional view taken along the line V-V in FIG. 2.

The boom 16 has the boom head 16T at the distal end thereof (FIG. 9). The boom head 16T is a member to be located at the most distal end of a plurality of boom members, and constitutes the boom distal end 16Q described above. The boom head 16T has the jib supporting part 161 and the backstop supporting part 162 (see FIG. 9). When the boom 16 rises with respect to the upper slewing body 12, the backstop supporting part 162 is located in the rear of the jib supporting part 161. When the boom 16 is lowered to the upper slewing body 12, the backstop supporting part 162 is located in the rear of and above the jib supporting part 161.

The lower jib 18A (FIG. 2) is a member constituting a proximal end of the jib 18 to be detachably attached to the boom distal end 16Q of the boom 16. In assembling and disassembling of the crane 1, the lower jib 18A of the jib 18 is detached from the boom 16 as shown in FIG. 2 so that the lower jib 18A and the strut 55 are integrally transportable in a state where the strut 55 is mounted on the lower jib. At this time, the rear jib backstop 60 is held on the strut 55, and the front jib backstop 61 is held on the lower jib 18A.

The strut 55 includes a strut proximal end 55S, the strut distal end 55T, a backstop connection part 55Q, and a backstop holding part 55R.

The strut proximal end 55S is a proximal end of the strut 55 and is supported rotatably in a tilting direction about a reference rotation central axis (CL) extending horizontally at the boom distal end 16Q via the jib proximal end 18P. The strut distal end 55T is a distal end of the strut 55 and is located opposite the strut proximal end 55S. The backstop connection part 55Q is located between the strut proximal end 55S and the strut distal end 55T in a longitudinal direction of the strut 55. Specifically, the backstop connection part 55Q is arranged on an upper surface portion of the strut 55 in a substantially middle portion of the strut 55 in the longitudinal direction thereof in the state where the strut 55 is mounted on the lower jib 18A. The backstop connection part 55Q is connected to a fulcrum part 60S of the rear jib backstop 60 to rotatably support the fulcrum part 60S. The backstop holding part 55R is located closer to the strut proximal end 55S than the backstop connection part 55Q. The backstop holding part 55R detachably holds a distal end 60T of the rear jib backstop 60.

The rear jib backstop 60 (backstop) has the fulcrum part 60S and the distal end 60T. The fulcrum part 60S serves as a proximal end of the rear jib backstop 60 and rotatably supports the strut 55. The distal end 60T is located opposite the fulcrum part 60S in the rear jib backstop 60 and is rotatably connected to the backstop supporting part 162 at the boom distal end 16Q. In FIG. 2 to FIG. 4, a direction, i.e., a front-rear direction in each drawing, in which the rear jib backstop 60 extends longitudinally is referred to as an "axial direction" of the rear jib backstop 60.

Figure 15:
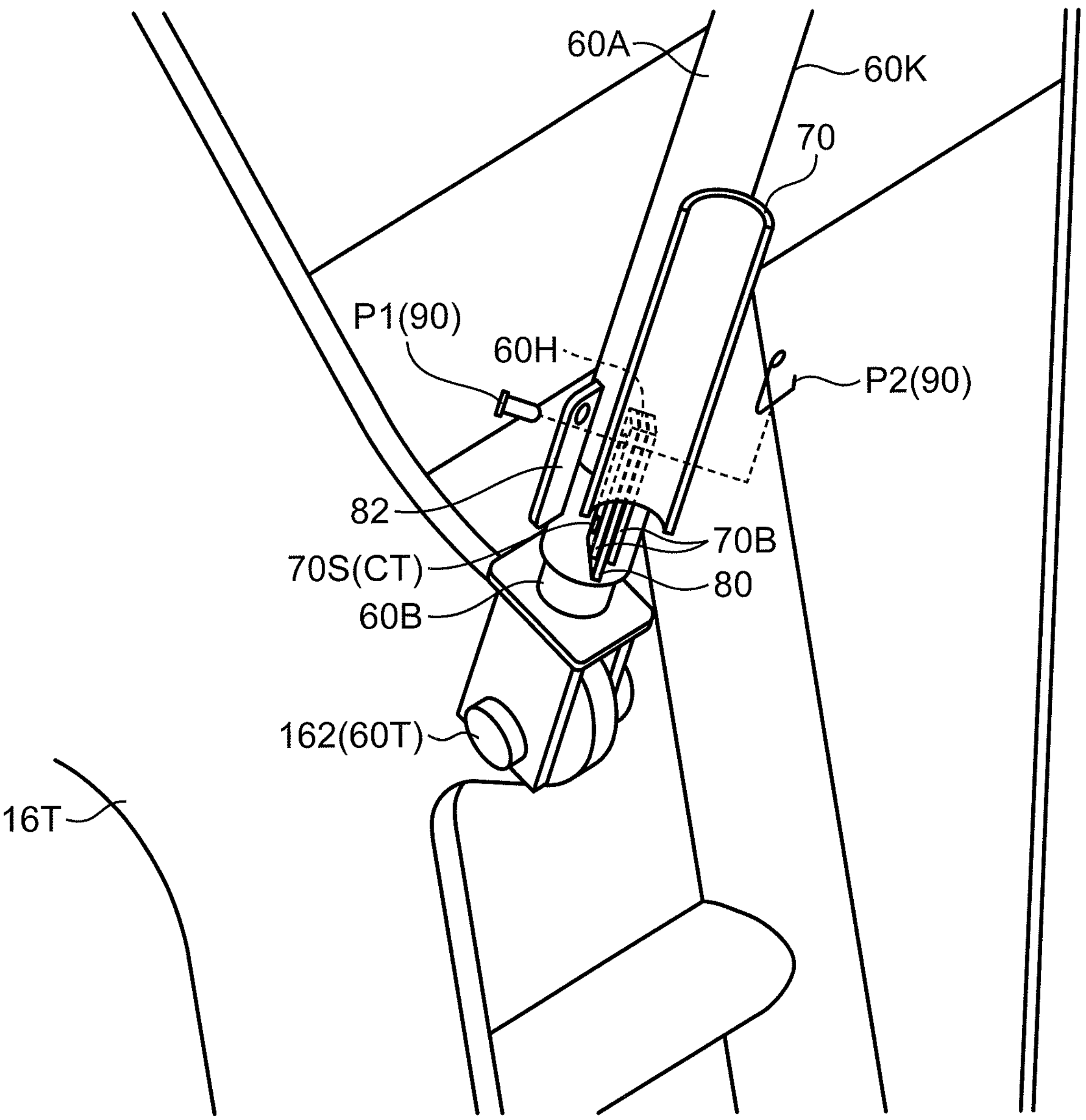
FIG. 15 is a perspective view of a state of a spacer in a change from an accommodation posture to a hanging posture in the crane in the embodiment of the present invention.

The rear jib backstop 60 includes an outer cylinder 60A (FIG. 3), an inner cylinder 60B, a spacer 70, a spacer holder 80, and a lock mechanism 90 (FIG. 15). The rear jib backstop 60 is extendable and contractible in accordance with movement of the inner cylinder 60B relative to the outer cylinder 60A.

The outer cylinder 60A has a cylindrical shape having a center line extending in the axial direction of the rear jib backstop 60. The outer cylinder 60A includes an outer cylinder proximal end to be supported by the backstop connection part 55Q of the strut 55 rotatably about a first rotation central axis (C1) being parallel to the reference rotation central axis CL, and an outer cylinder distal end located opposite the fulcrum part 60S. The outer cylinder proximal end of the outer cylinder 60A constitutes the fulcrum part 60S of the rear jib backstop 60.

The inner cylinder 60B has a cylindrical shape having a center line (that is identical to the center line of the outer cylinder 60A) extending in the axial direction of the rear jib backstop 60. The inner cylinder 60B has an outer diameter which is slightly smaller than an inner diameter of the outer cylinder 60A. The inner cylinder 60B includes an inner cylinder proximal end to be supported by the backstop holding part 55R rotatably about a second rotation central axis C2 being parallel to the reference rotation central axis CL, and an inner cylinder distal end located opposite the inner cylinder proximal end to extend in the outer cylinder 60A through the outer cylinder proximal end of the outer cylinder 60A. The inner cylinder 60B is movable relative to the outer cylinder 60A in the axial direction to permit a change in a distance between the backstop supporting part 162 and the backstop connection part 55Q in accordance with a rotation of the strut 55 about the reference rotation central axis CL to the boom 16. The inner cylinder proximal end of the inner cylinder 60B constitutes the distal end 60T of the rear jib backstop 60.

Figure 14:
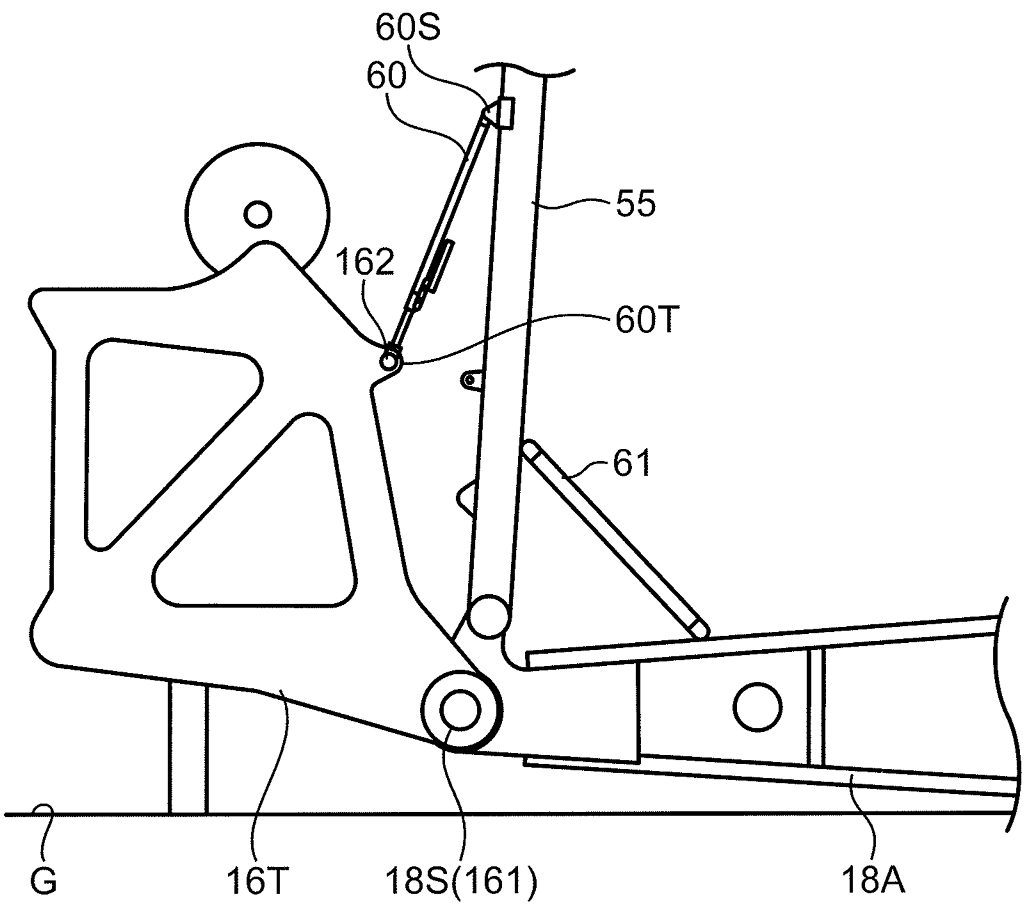
FIG. 14 is an enlarged side view of a state of a rear backstop connected to the boom head in the crane in the embodiment of the present invention.

Although the distal end 60T (inner cylinder proximal end) of the rear jib backstop 60 is held by the backstop holding part 55R in FIG. 2 as described above, the distal end 60T is attachable to the backstop supporting part 162 of the boom distal end 16Q by detaching the distal end 60T from the backstop holding part 55R (see FIG. 14).

The spacer 70 has a predetermined dimension in the axial direction of the rear jib backstop 60 and a semi-cylindrical inner surface fittable on an outer surface of the inner cylinder 60B in a direction perpendicularly intersecting the axial direction (see FIG. 5 to FIG. 8). The spacer 70 has opposite ends in the axial direction respectively coming into contact with the outer cylinder distal end of the outer cylinder 60A and the inner cylinder proximal end of the inner cylinder 60B so that the spacer 70 keeps the rear jib backstop 60 from contracting in such a manner that the outer cylinder distal end comes closer to the inner cylinder proximal end than a distance corresponding to the dimension of the spacer 70. That is to say, the spacer 70 keeps the rear jib backstop 60 from contracting to a predetermined length or shorter in a raised state of the boom 16, and prevents the strut 55 and the jib 18 from being blown rearward. In another embodiment, one end of the spacer 70 in the axial direction may come into contact with a distal end of the spacer holder 80 in place of the outer cylinder distal end of the outer cylinder 60A. In this case, the distal end of the spacer holder 80 can constitute a part of the outer cylinder distal end of the outer cylinder 60A.

The spacer holder 80 is attached to the distal end of the outer cylinder 60A of the rear jib backstop 60 (FIG. 3). The spacer holder 80 supports the spacer 70 swingably about a swing central axis CT (FIG. 6) perpendicularly intersecting the axial direction. Specifically, the spacer holder 80 supports the spacer 70 in such a manner that the spacer 70 swings about the swing central axis CT under the weight of the spacer 70 to fit on the inner cylinder 60B when the boom 16 rises with respect to the upper slewing body 12 while supporting the strut 55. In the embodiment, the spacer holder 80 is attached to or supported by the outer cylinder 60A rotatably relative to the outer cylinder 60A in a circumferential direction.

The lock mechanism 90 (FIG. 15) is a member to be detachably attached to the rear jib backstop 60 and the spacer 70 to lock the spacer 70 in such a manner as to keep the spacer 70 from swinging about the swing central axis CT regardless of a posture of the strut 55 to the boom 16. Specifically, the lock mechanism 90 is shiftable between a locking state and an unlocking state. The locking state is a state of the lock mechanism 90 that locks the spacer 70 to keep the spacer 70 from swinging about the swing central axis CT in a state where the spacer 70 is located away from the outer surface of the inner cylinder 60B. The unlocking state is a state of the lock mechanism 90 that permits the spacer 70 to swing about the swing central axis CT. The lock mechanism 90 may be to be detachably attached to at least one of the rear jib backstop 60 and the spacer 70.

Figure 6:
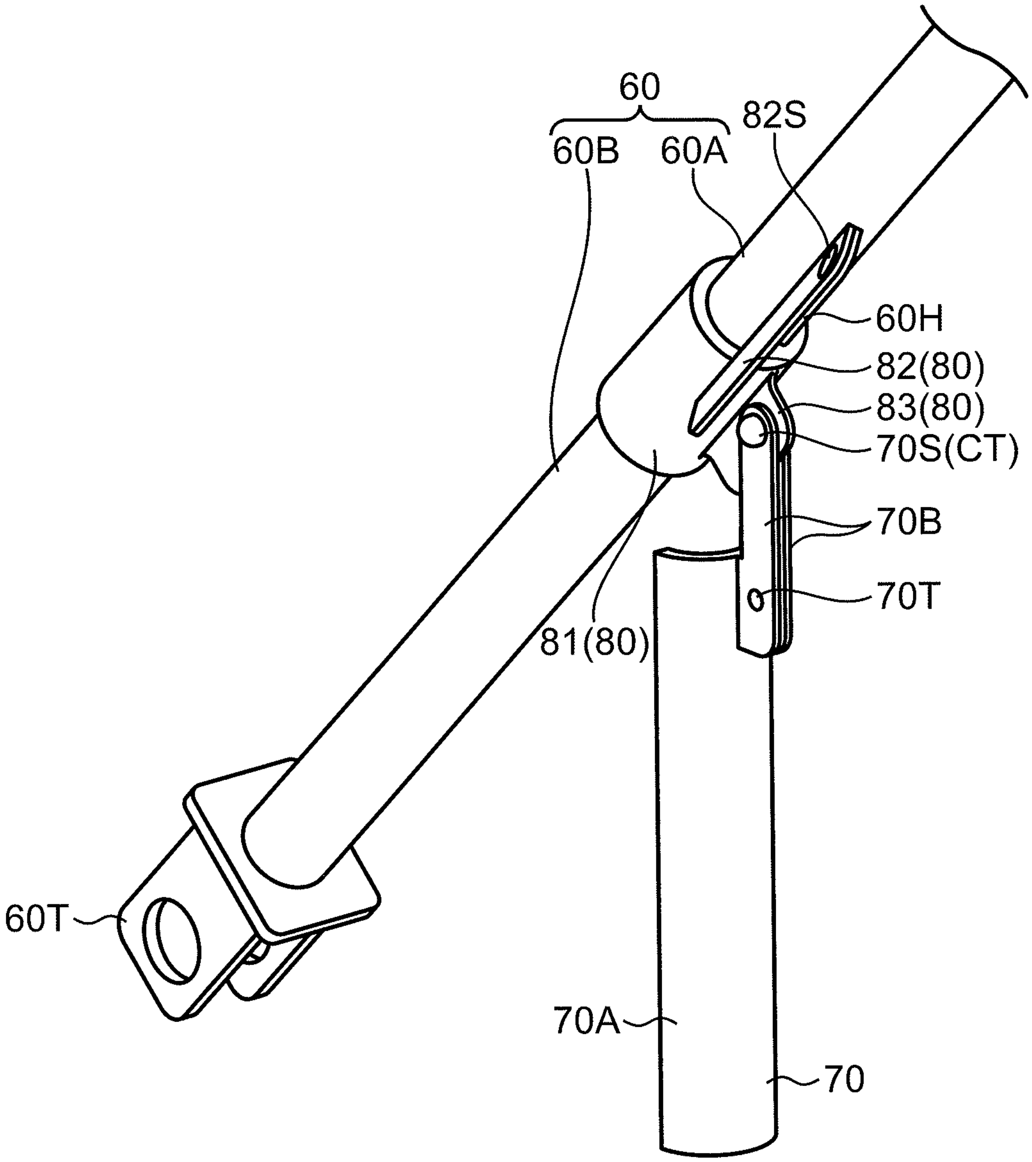
FIG. 6 is a perspective view of a state of a spacer being fitting onto an inner cylinder of the backstop for the crane in the embodiment of the present invention.
Figure 7:
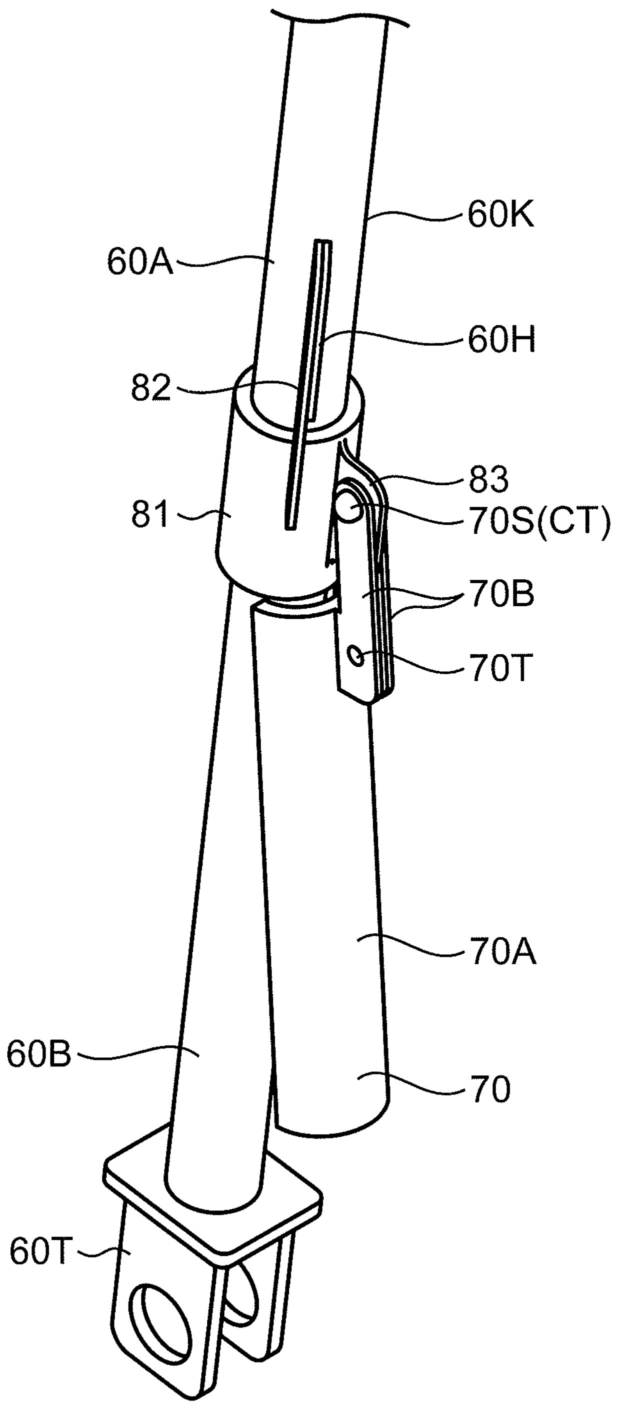
FIG. 7 is a perspective view of a state of the spacer being fitting onto the inner cylinder of the backstop for the crane in the embodiment of the present invention.
Figure 8:
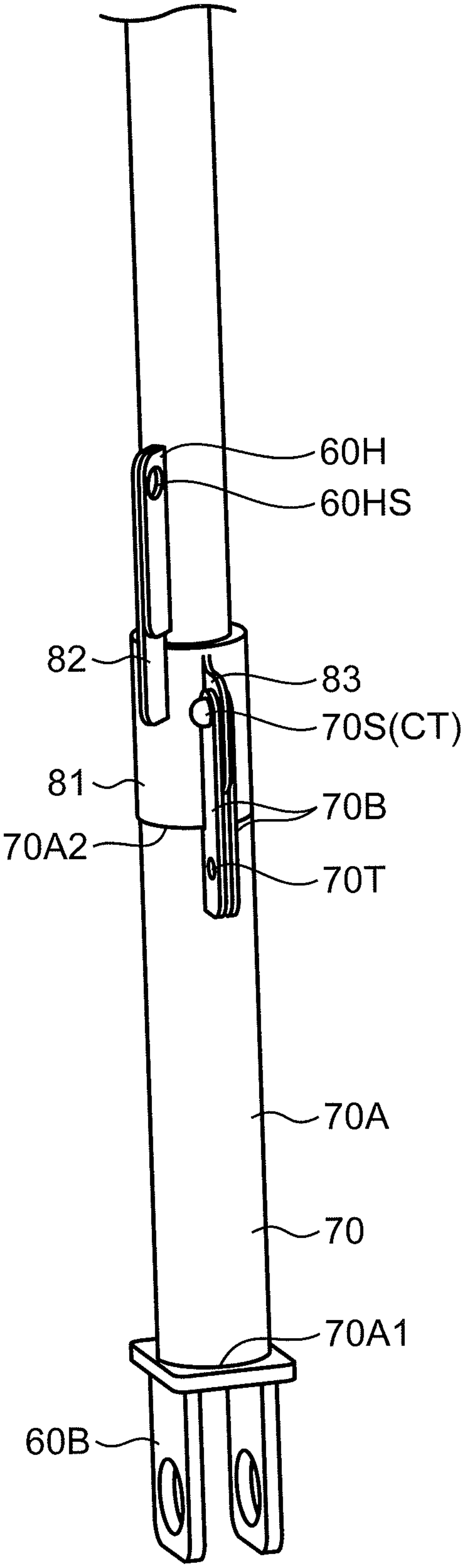
FIG. 8 is a perspective view of a state of the spacer fitting on the inner cylinder of the backstop for the crane in the embodiment of the present invention.

Each of FIG. 6, FIG. 7, and FIG. 8 is a perspective view of a state of the spacer 70 being fitting onto or fitting on the inner cylinder 60B of the rear jib backstop 60 for the crane 1 in the embodiment. Next, a structure of each member will be described in further detail.

Figure 18:
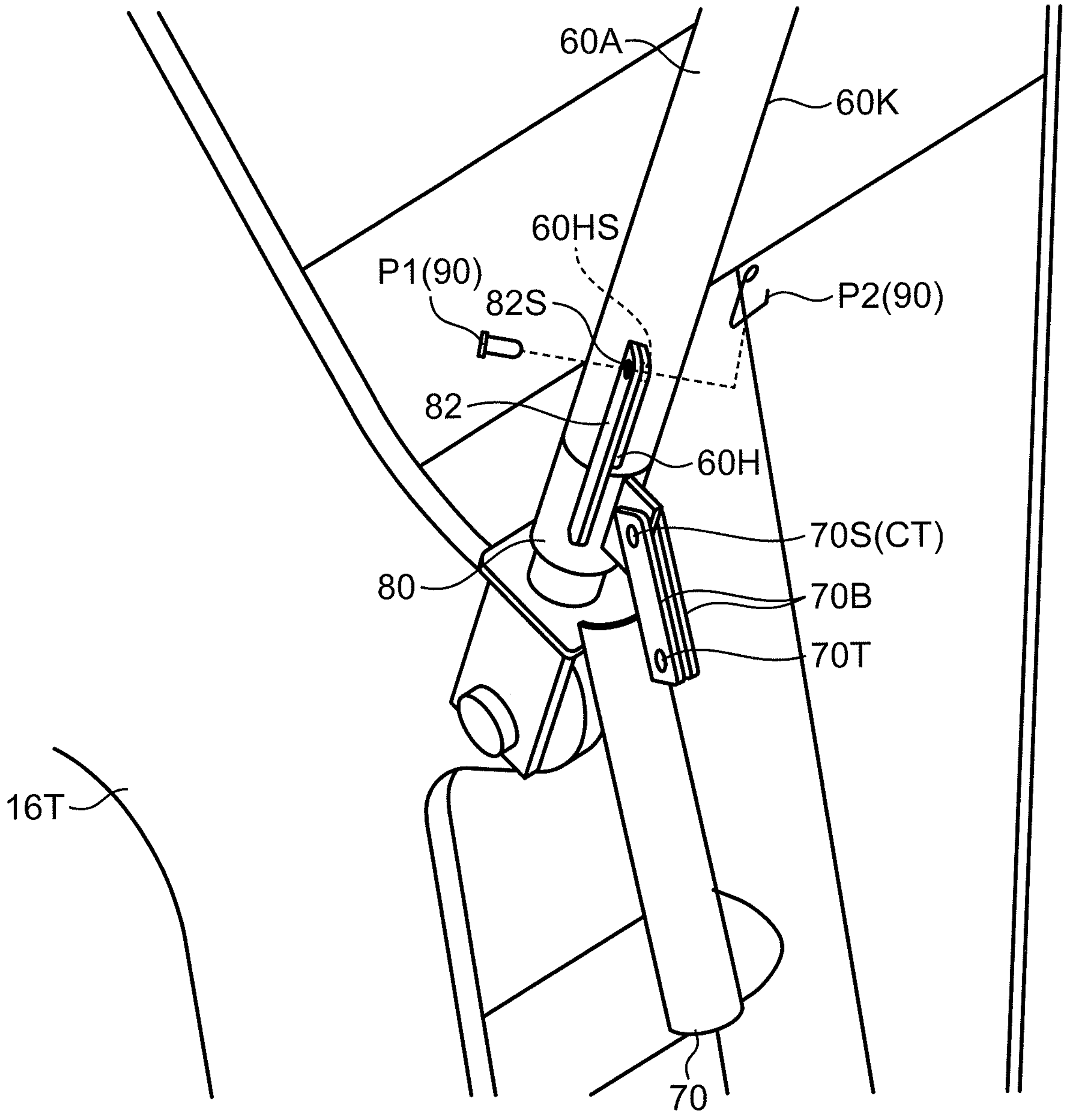
FIG. 18 is a perspective view of the state of the spacer changed from the accommodation posture to the hanging posture in the crane in the embodiment of the present invention.

The outer cylinder 60A of the rear jib backstop 60 has an outer cylinder main body 60K and an outer cylinder retainer 60H (see FIG. 18).

The outer cylinder main body 60K is a main body of the outer cylinder 60A in the form of a cylindrical member including the outer cylinder proximal end and the outer cylinder distal end. The outer cylinder main body 60K is configured to support the spacer holder 80 and receive the inner cylinder 60B therein.

The outer cylinder retainer 60H is a plate member arranged on an outer surface of the outer cylinder main body 60K and radially protrudes from the outer surface. The outer cylinder retainer 60H has a first pin hole 60HS in a direction perpendicularly intersecting the axial direction of the rear jib backstop 60. The outer cylinder retainer 60H is located farther away from the spacer 70 than the spacer holder 80 in a hanging posture of the spacer 70 to be described later (see FIG. 18).

The spacer 70 has a spacer main body 70A, a spacer supported part 70B, and a spacer fulcrum part 70S (see FIG. 6).

The spacer main body 70A is a main body of the spacer 70 in the form of a member having a semi-cylindrical shape and an inner surface fittable on the outer surface of the inner cylinder 60B.

The spacer supported part 70B extends from the spacer main body 70A in a longitudinal direction or an axial direction of the spacer 70. The spacer fulcrum part 70S is located at a distal end of the spacer supported part 70B to be connected to or supported by the spacer holder 80 swingably about the swing central axis CT. In the embodiment, the spacer supported part 70B includes two plate members spaced apart from each other. Each of the plate members of the spacer supported part 70B has a second pin hole 70T (FIG. 6 to FIG. 8) in a direction perpendicularly intersecting the axial direction in a portion closer to the spacer main body 70A than the swing central axis CT.

The spacer holder 80 further has a holder cylindrical part 81, a holder retainer 82, and a holder supporting part 83 (FIG. 6).

The holder cylindrical part 81 is a main body of the spacer holder 80, and fits on or supported by the outer surface of the outer cylinder 60A rotatably relative to the outer cylinder 60A or the outer cylinder main body 60K in the circumferential direction.

The holder supporting part 83 is arranged on an outer surface of the holder cylindrical part 81 for supporting the spacer supported part 70B of the spacer 70 swingably about the swing central axis CT. The holder supporting part 83 radially protrudes from the outer surface.

The holder retainer 82 protrudes in the axial direction from the holder cylindrical part 81 toward the outer cylinder proximal end of the outer cylinder 60A at a position different from a position of the holder supporting part 83 on the outer surface of the holder cylindrical part 81 in the circumferential direction. The holder retainer 82 has a third pin hole 82S in a direction perpendicularly intersecting the axial direction. The holder retainer 82 serves as a grip part configured to be gripped by an operator for rotating the spacer holder 80.

Figure 16:
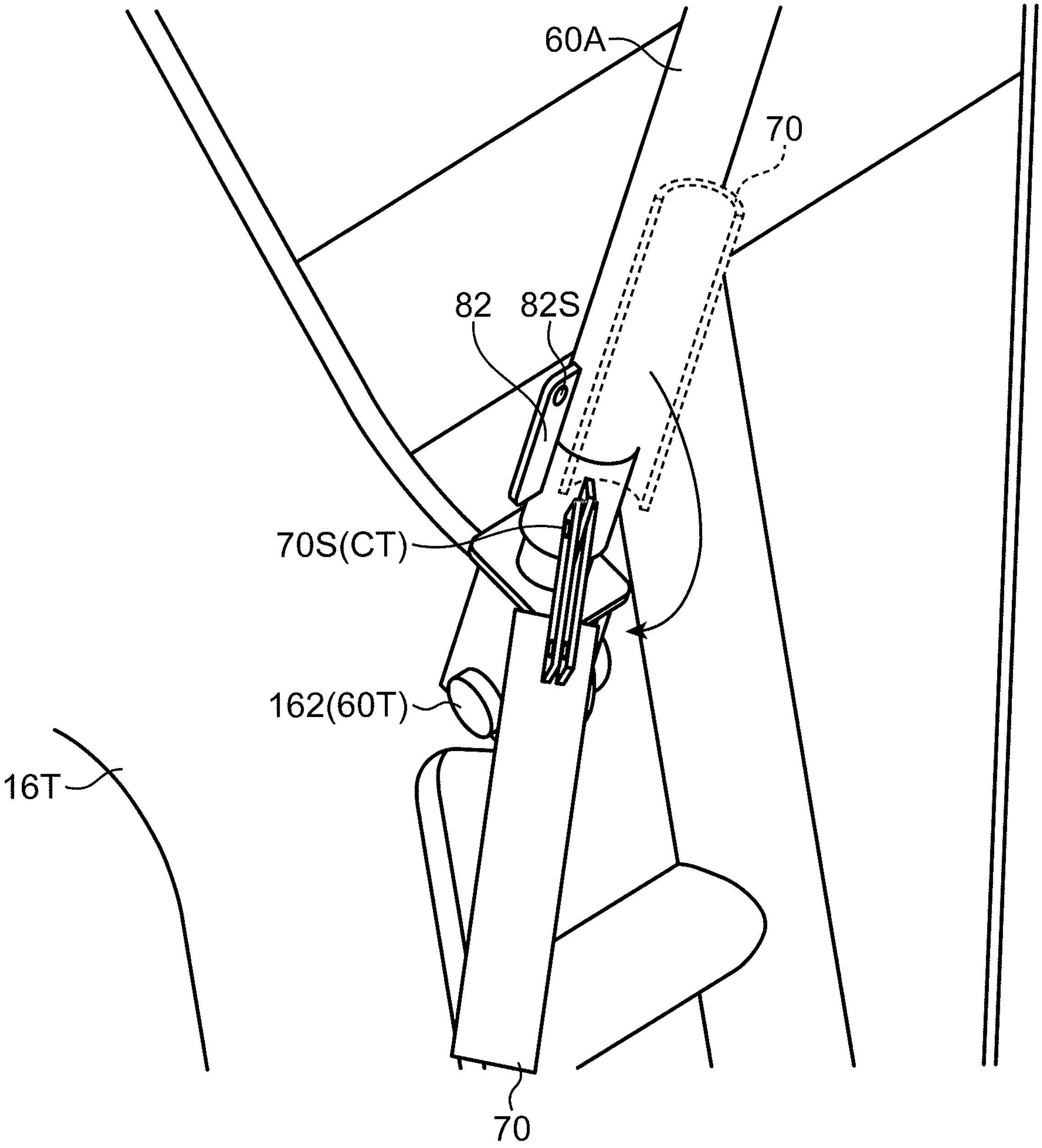
FIG. 16 is a perspective view of a state of the spacer changed from the accommodation posture to the hanging posture in the crane in the embodiment of the present invention.

In the embodiment, the lock mechanism 90 includes a fastening pin P1 and a spring pin P2 (see FIG. 15). Each of the pins has a function of restricting or locking the spacer 70 or the spacer holder 80 at a position and in a posture to be described later. The fastening pin P1 is allowed to pass through the first pin hole 60HS, the second pin hole 70T, and the third pin hole 82S (FIG. 16 and FIG. 18). The spring pin P2 is attached to a distal end of the fastening pin P1 to serve as a so-called retainer pin.

Subsequently, basic operability of the spacer 70 will be described with reference to FIG. 6 to FIG. 8.

In assembling and disassembling of the crane 1, the rear jib backstop 60 rotates about the fulcrum part 60S (the first rotation central axis C1) as a fulcrum in a tilting operation of (relative posture change in) the boom 16 and the strut 55 with respect to the upper slewing body 12. At this time, as shown in FIG. 6, in a state where an extension amount of the inner cylinder 60B with respect to the outer cylinder 60A is larger than a dimension of the spacer 70 in the axial direction, the spacer 70 swings about the swing central axis CT from a posture perpendicularly extending downward under the weight thereof and a cylindrical inner surface of the spacer main body 70A of the spacer 70 comes closer to the outer surface of the inner cylinder 60B (FIG. 7). Before long, as shown in FIG. 8, a distal end 70A1 of the spacer main body 70A comes into contact with a flange at the proximal end of the inner cylinder 60B in the axial direction and a proximal end 70A2 of the spacer main body 70A comes into contact with the distal end of the outer cylinder 60A in the axial direction in accordance with contracting of the inner cylinder 60B relative to the outer cylinder 60A after fitting of the spacer main body 70A of the spacer 70 on the outer surface of the inner cylinder 60B. This results in keeping the distal end of the outer cylinder 60A from coming further closer to the proximal end of the inner cylinder 60B to fix the length of the rear jib backstop 60. Consequently, as shown in FIG. 1, the rear jib backstop 60 supports the strut 55 from below to prevent the strut 55 and the jib 18 from being blown rearward. The spacer 70 may fit to the inner cylinder 60B with a predetermined gap between the inner surface of the spacer 70 and the outer surface of the inner cylinder 60B.

Figure 10:
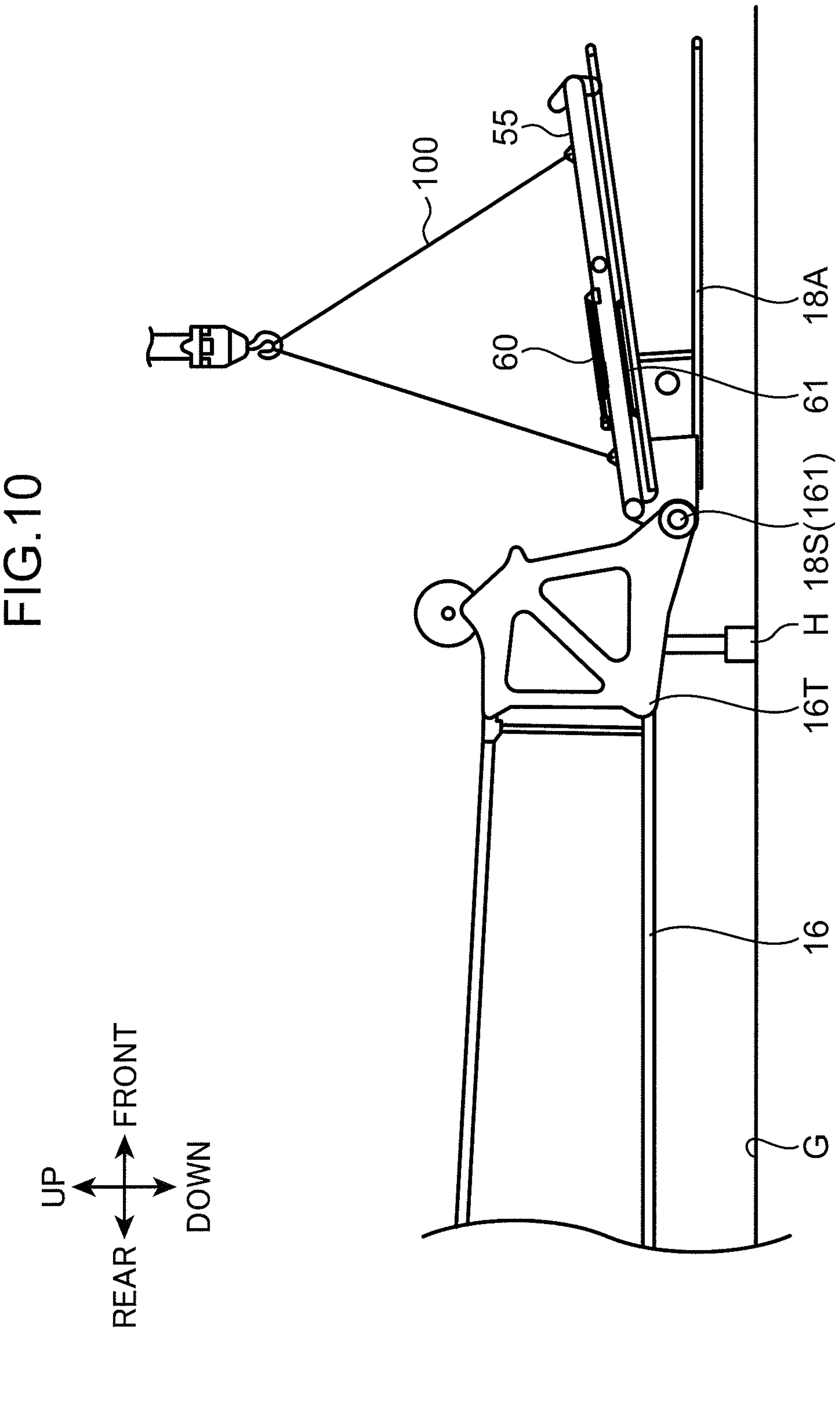
FIG. 10 is a side view of a state of the lower jib and the strut connected to the boom head of the crane in the embodiment of the present invention.
Figure 11:
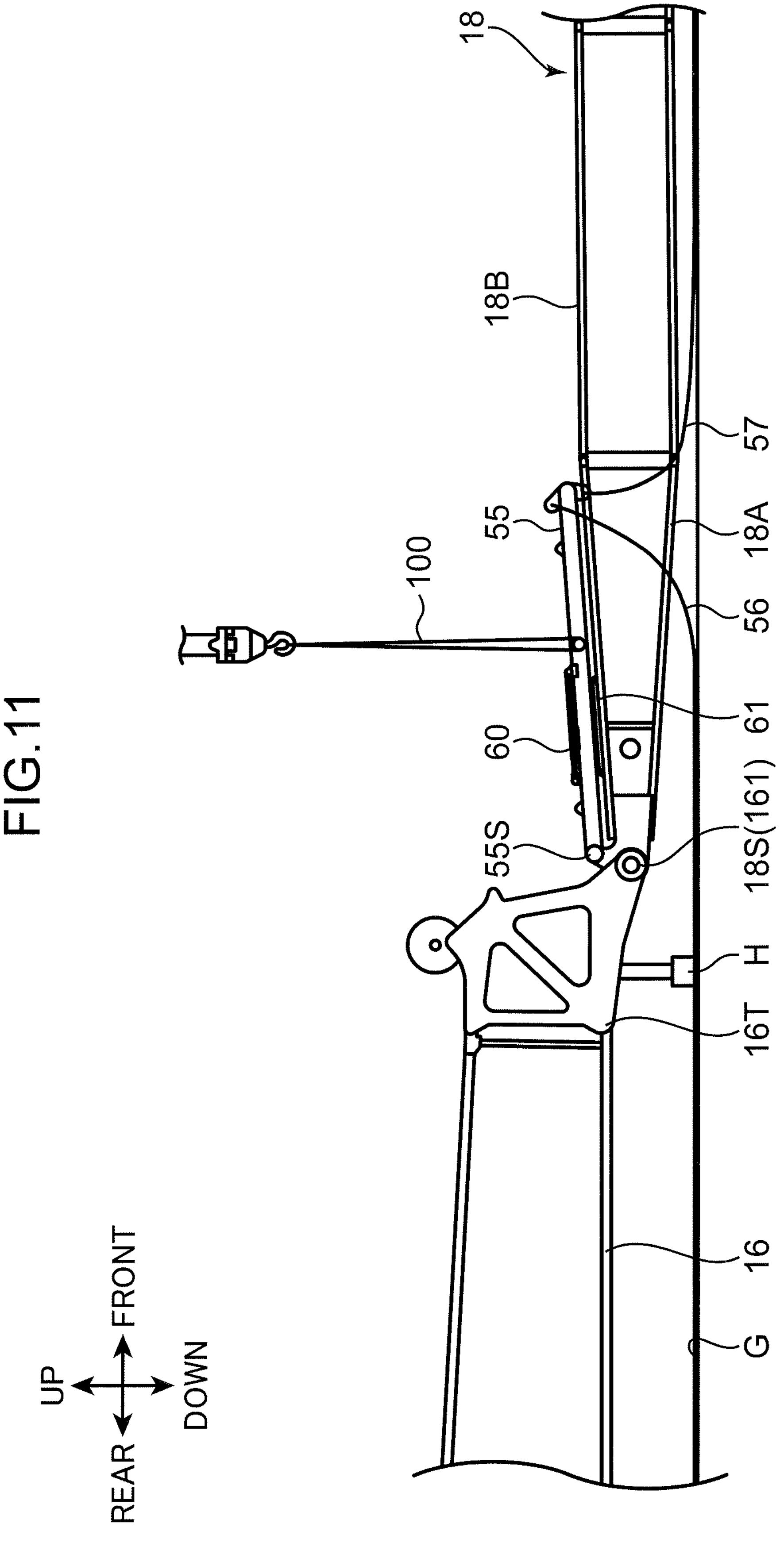
FIG. 11 is a side view of a state of the strut being raised with respect to the lower jib of the crane in the embodiment of the present invention.
Figure 12:
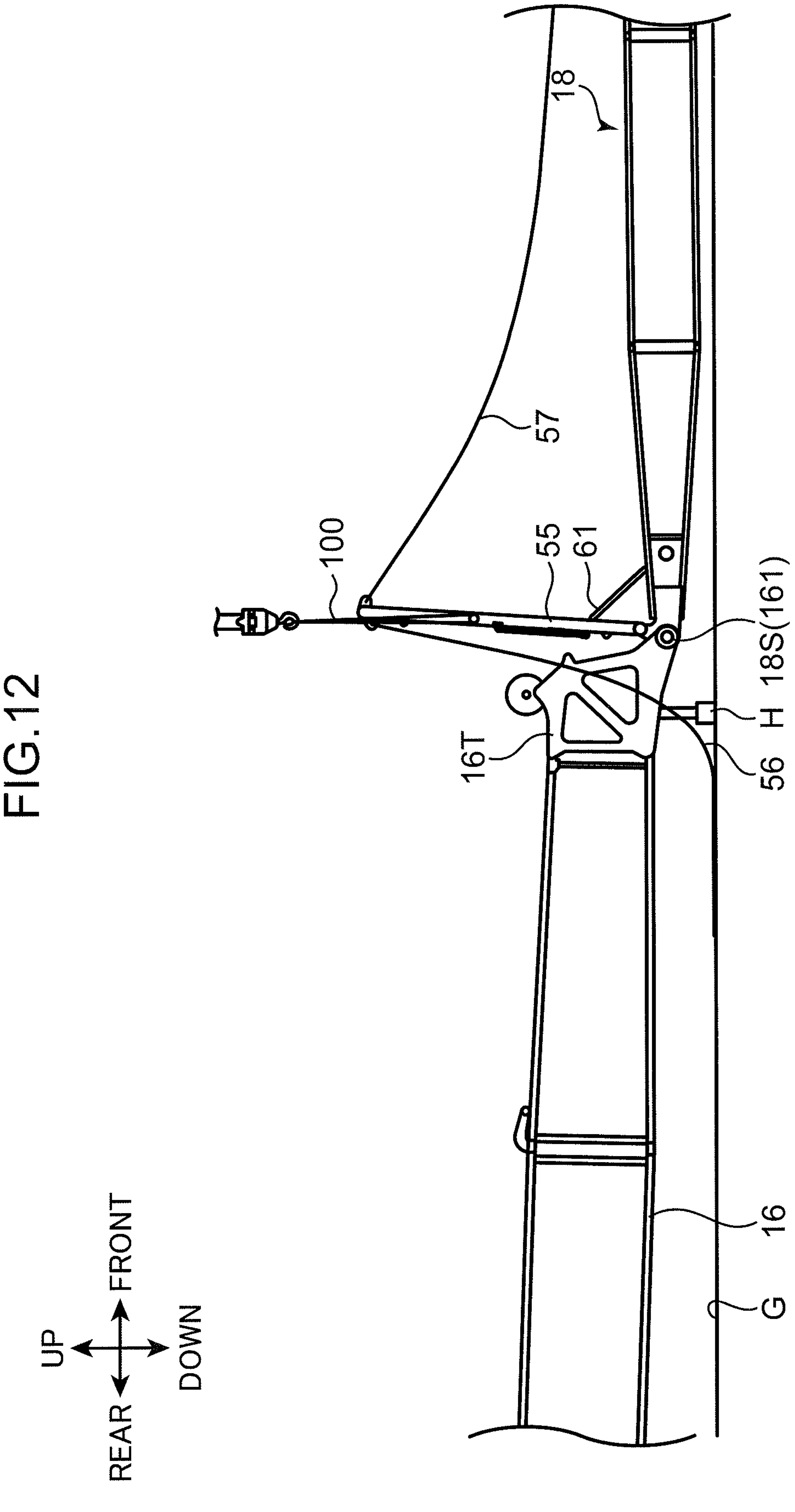
FIG. 12 is a side view of a state of the strut having been raised to stand in the crane in the embodiment of the present invention.
Figure 13:
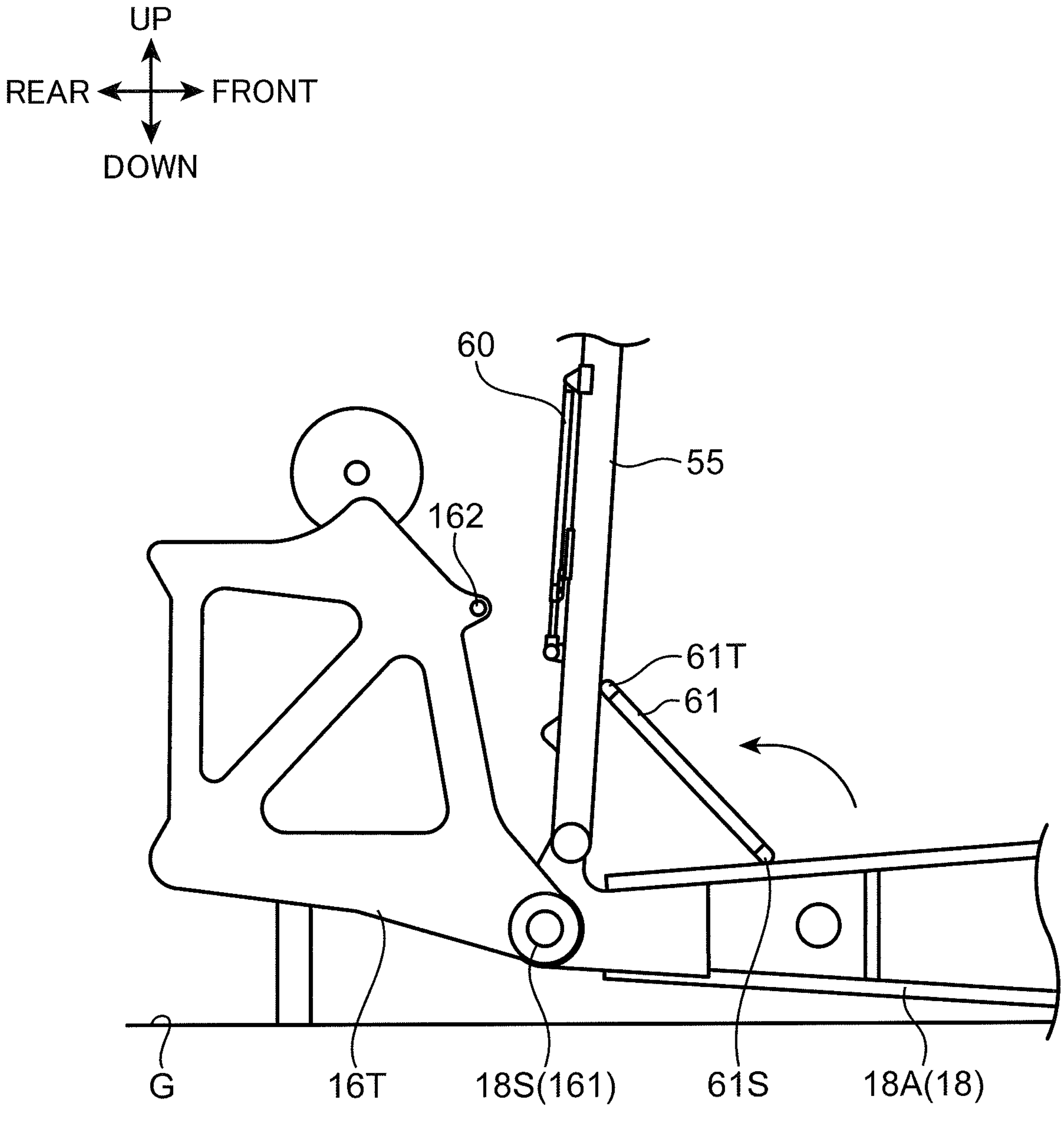
FIG. 13 is an enlarged side view of a state of a front backstop being raised in the crane in the embodiment of the present invention.

Next, a state of the spacer 70 being fitting onto the inner cylinder 60B of the rear jib backstop 60 through assembling of the crane 1 will be further described. Each of FIG. 9 and FIG. 10 is a side view of a state of the lower jib 18A and the strut 55 being connected to or a state thereof connected to the boom head 16T of the crane 1 in the embodiment. FIG. 11 is a side view of a state of the strut 55 being raised with respect to the lower jib 18A of the crane 1. FIG. 12 is a side view of a state of the strut 55 having been raised to stand in the crane 1. FIG. 13 is an enlarged side view of a state of the front jib backstop 61 being raised in the crane 1. FIG. 14 is an enlarged side view of a state of the rear jib backstop 60 connected to the boom head 16T in the crane 1.

For instance, as shown in FIG. 2 and FIG. 3, for assembling of the crane 1, the strut 55 is mounted on the lower jib 18A of the jib 18 to be integrally carried to a worksite by a transportation vehicle, such as a trailer. At this time, as shown in FIG. 3 and FIG. 5, the spacer 70 is located outside a space between the strut 55 and the outer cylinder 60A in the left-right direction by a rotation of the spacer holder 80 with respect to the outer cylinder 60A of the rear jib backstop 60. This makes it possible to stably mount the rear jib backstop 60 on the strut 55 without disturbance of the spacer 70.

As shown in FIG. 9, an auxiliary hoisting device 100 (an auxiliary crane or an auxiliary machine) hoists the lower jib 18A and the strut 55 from the trailer to move these components toward the boom head 16T of the boom 16 arranged on the ground G in advance. The boom head 16T of the boom 16 is located on the ground G via a support H (support base).

Before long, as shown in FIG. 10, a jib foot 18S of the lower jib 18A is set to a position of the jib supporting part 161 of the boom head 16T so that an unillustrated connection pin is inserted in pin holes formed in the jib foot and the jib supporting part, and the lower jib 18A is supported rotatably at the boom head 16T of the boom 16.

Subsequently, as shown in FIG. 11, an operator connects other jib members including an intermediate jib and an upper jib to the distal end of the lower jib 18A to assemble the jib 18. The operator further connects one end of the rear jib guy line 56 and one end of the front jib guy line 57 to the distal end of the strut 55. The front jib guy line 57 has another end fixed to the jib distal end 18Q of the jib 18 (FIG. 1). Further, a rope of the auxiliary hoisting device 100 is connected to a strut hoisted part 55P (FIG. 2 to FIG. 4) of each of the left and right struts 55. Then, the auxiliary hoisting device 100 raises the strut 55 toward the boom head 16T as shown in FIG. 12, and raises the front jib backstop 61 about the fulcrum part 61S as a fulcrum to connect the distal end 61T of the front jib backstop 61 to a connection portion of the strut 55 as denoted by the arrow in FIG. 13.

Next, as shown in FIG. 14, the operator detaches the distal end 60T of the rear jib backstop 60 from the backstop holding part 55R (FIG. 2) of the strut 55, rotates the rear jib backstop 60 rearward about the fulcrum part 60S as a fulcrum, and connects the distal end 60T to the backstop supporting part 162 of the boom head 16T by an unillustrated pin. As a result, the distal end 60T of the rear jib backstop 60 is supported by the backstop supporting part 162 rotatably about the second rotation central axis C2 (see FIG. 2 and FIG. 20). The strut 55 is supported by the boom 16 (boom head 16T) and the jib 18 (lower jib 18A) via the rear jib backstop 60 and the front jib backstop 61.

Each of FIG. 15 to FIG. 18 is a perspective view of a state of the spacer 70 in a change from or changed from an accommodation posture to a hanging posture in the crane 1 in the embodiment.

In the state shown in FIG. 14 (in transportation as well), the spacer 70 is in an inverse posture (facing posture) after having been rotated about the swing central axis in such a manner that the outer surface of the spacer 70 or the spacer main body 70A faces the outer cylinder 60A as shown in FIG. 15. The fastening pin P1 passes through the second pin hole 70T (FIG. 17) of the spacer 70 and the first pin hole 60HS (FIG. 18) of the outer cylinder retainer 60H of the outer cylinder 60A, and the spring pin P2 is attached to the distal end of the fastening pin P1 to keep the spacer 70 from swinging about the swing central axis CT and to keep the spacer holder 80 from moving (rotating) relative to the outer cylinder 60A in the circumferential direction (in the accommodation posture of the spacer 70 and in the locking state of the lock mechanism 90). In particular, in the embodiment, as shown in FIG. 15, the spacer 70 includes two spacer supported parts 70B to sandwich the outer cylinder retainer 60H of the outer cylinder 60A inserted therebetween, and the fastening pin P1 passes through corresponding second pin holes 70T (FIG. 7 and FIG. 8) and the first pin hole 60HS (FIG. 8). This achieves more stable retaining of the spacer 70. A way of retaining the spacer 70 is not limited to the embodiment, and, for example, a single spacer supported part 70B may be sufficient for the retaining.

Figure 17:
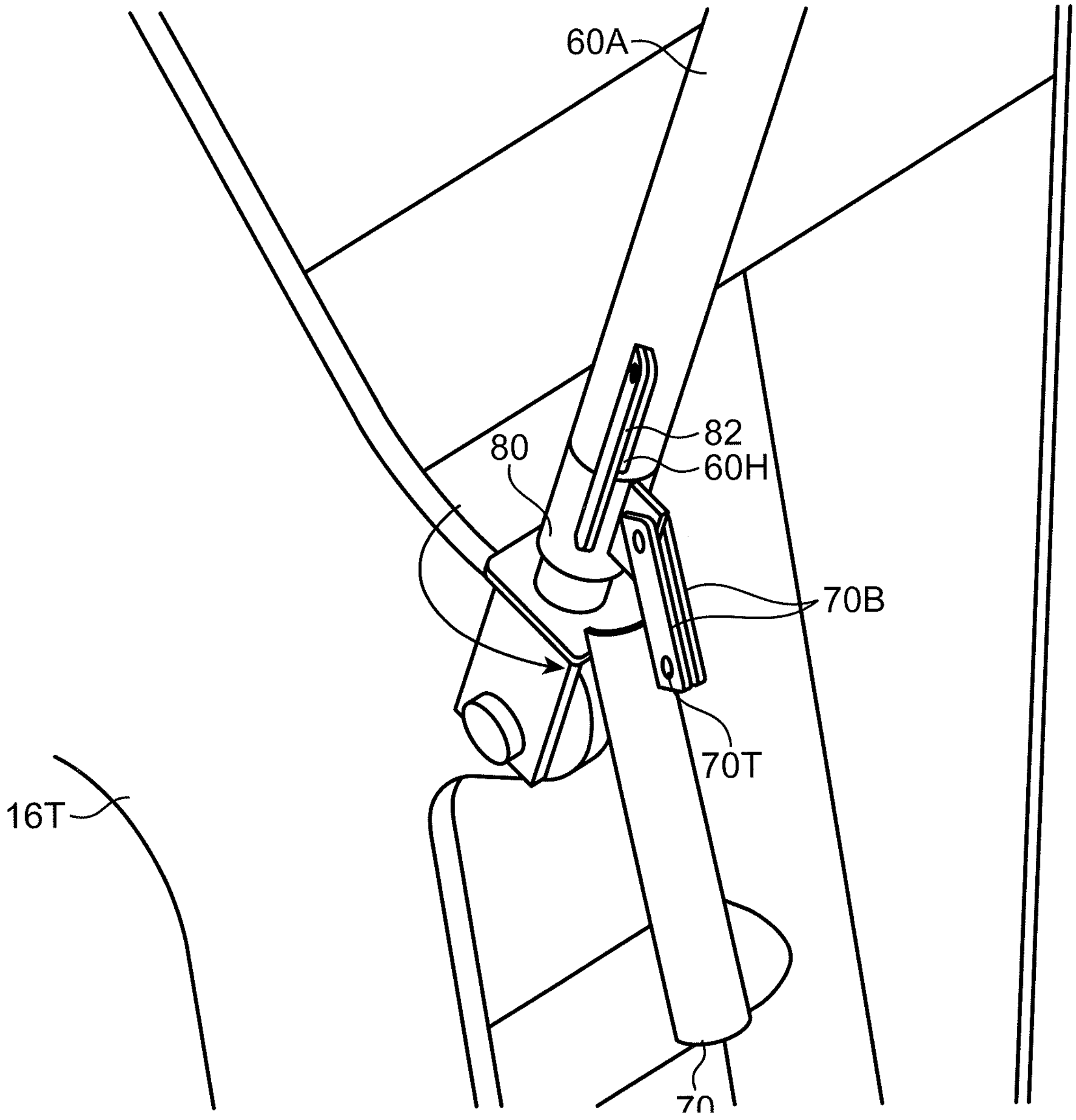
FIG. 17 is a perspective view of the state of the spacer changed from the accommodation posture to the hanging posture in the crane in the embodiment of the present invention.

In the state shown in FIG. 14 and FIG. 15, the operator sequentially removes the spring pin P2 and the fastening pin P1 to permit the spacer 70 to swing downward about the swing central axis CT as denoted by the arrow in FIG. 16. In other words, the spacer 70 hangs downward from the spacer holder 80. The spacer 70 extends from the spacer holder 80 outward in the left-right direction in this state, and thus, the operator rotates the spacer holder 80 holding the spacer 70 inward with respect to the outer cylinder 60A in the left-right direction as shown in FIG. 17. As a result, the spacer 70 is located to intersect a perpendicular plane bearing the center of the rear jib backstop 60 in such a manner that the perpendicular plane bears the center line of the spacer 70 as shown in FIG. 18. Here, the spacer 70 is located perpendicularly downward from the outer cylinder 60A (in the hanging posture of the spacer 70 and in the unlocking state of the lock mechanism 90).

Next, the operator sequentially inserts the fastening pin P1 having been previously removed into the first pin hole 60HS of the outer cylinder retainer 60H and the third pin hole 82S of the holder retainer 82. Then, the spring pin P2 is attached to the distal end of the fastening pin P1 to prevent the fastening pin P1 from falling off. This results in keeping the spacer holder 80 from rotating with respect to the outer cylinder 60A, and thus permitting the spacer 70 to swing about the swing central axis CT while preventing the spacer from moving leftward and rightward. It is seen from these perspectives that the same fastening pin P1 and the same spring pin P2 are adoptable in working, disassembling, and transportation of the crane 1 in the embodiment.

Figure 19:
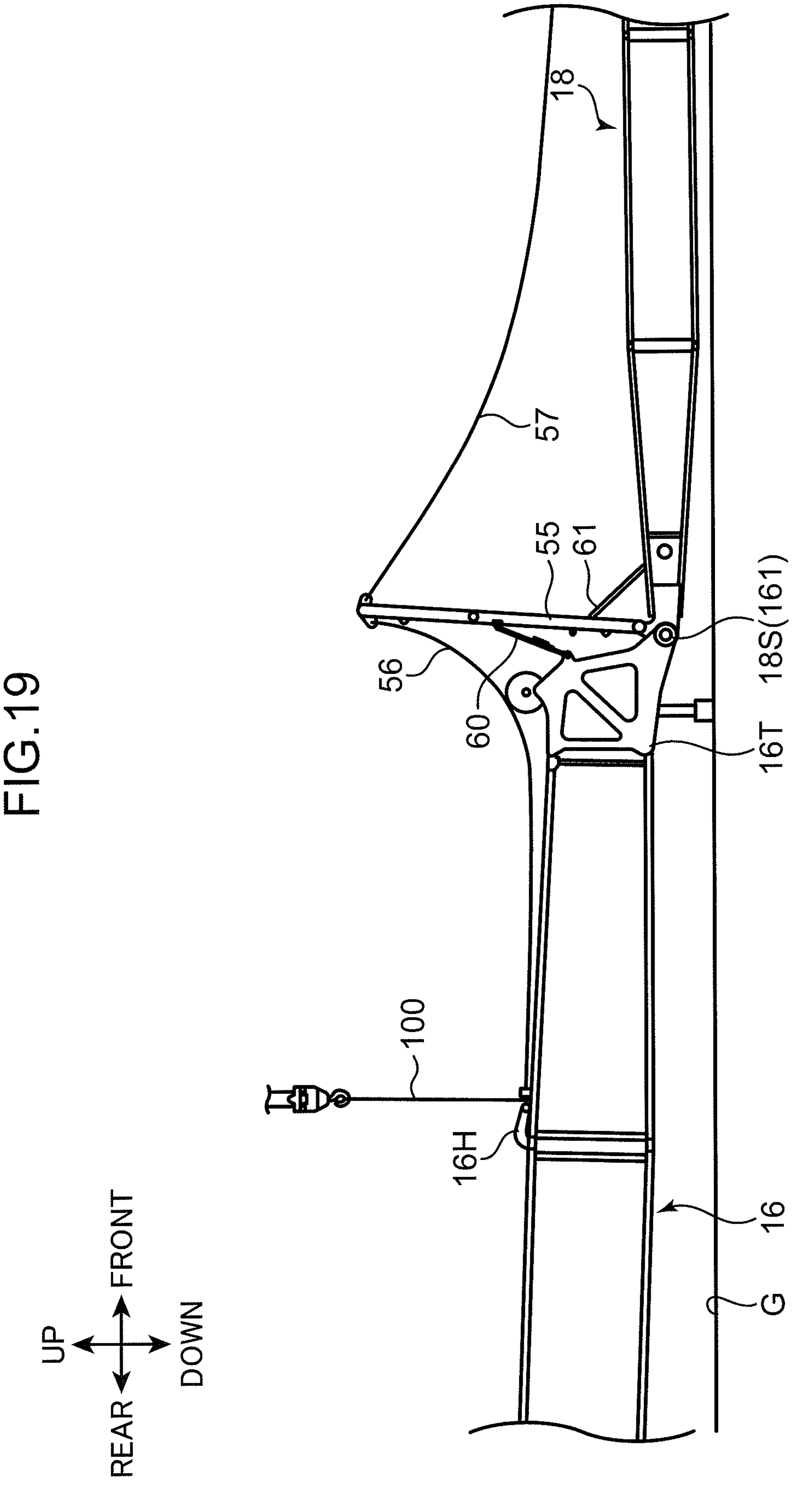
FIG. 19 is a side view of a state where an end of a boom guy line is connected to the boom in the crane in the embodiment of the present invention.

FIG. 19 is a side view of a state where the rear jib guy line 56 is connected to the boom 16 in the crane 1 in the embodiment. After completion of preparation for the spacer 70 as described above, the operator uses the auxiliary hoisting device 100 to hoist and connect another end of the rear jib guy line 56 to a guy line connection part 16H provided on the back surface of the boom 16.

Figure 20:
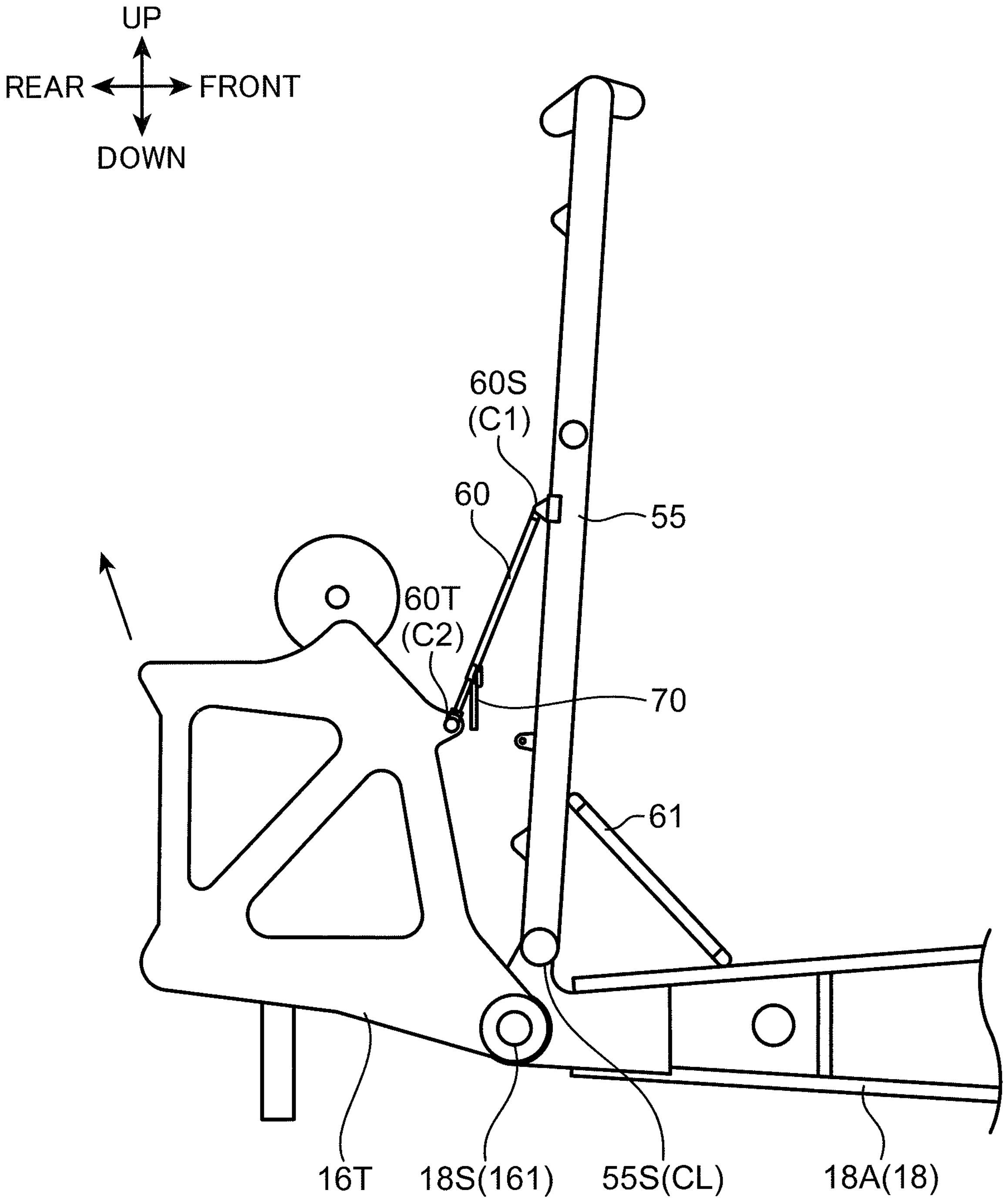
FIG. 20 is an enlarged side view of a state of the spacer being fitting onto the inner cylinder of the backstop when the boom rises in the crane in the embodiment of the present invention.
Figure 21:
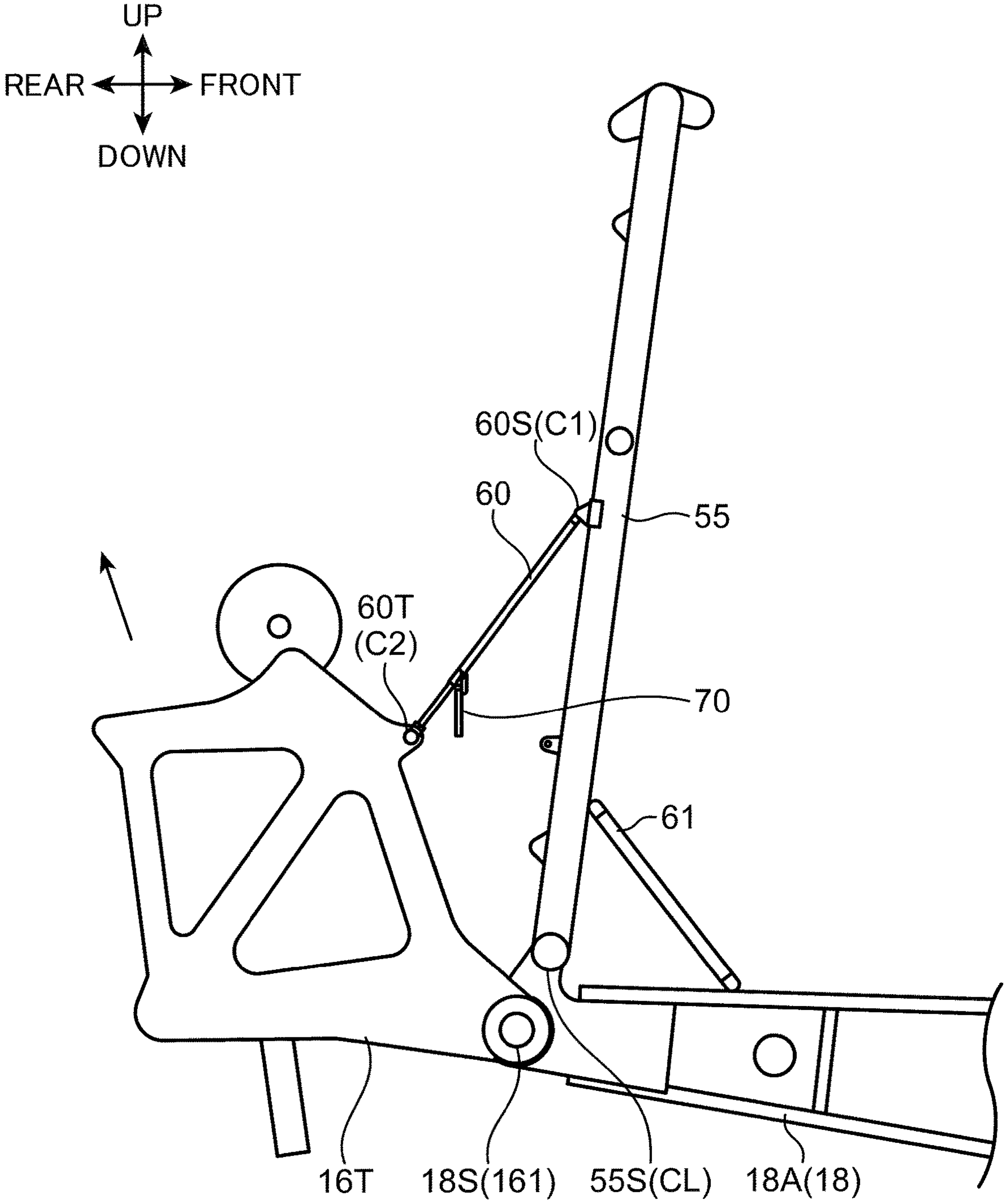
FIG. 21 is an enlarged side view of a state of the spacer being fitting onto the inner cylinder of the backstop when the boom rises in the crane in the embodiment of the present invention.
Figure 22:
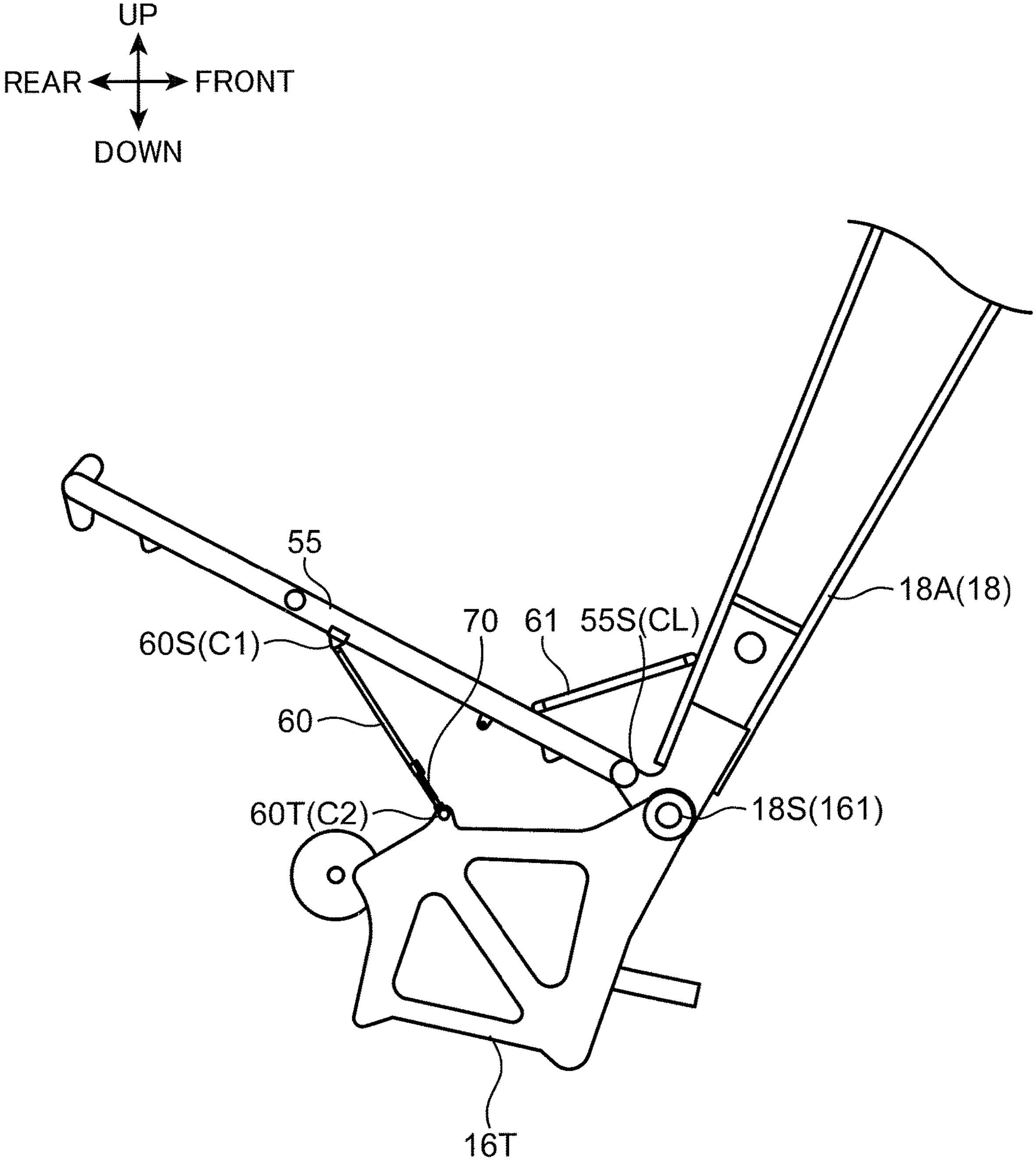
FIG. 22 is an enlarged side view of a state of the spacer fitting on the inner cylinder of the backstop in accordance with the rising of the boom in the crane in the embodiment of the present invention.

Each of FIG. 20 to FIG. 22 is an enlarged side view of a state of the spacer 70 being fitting onto or fitting on the inner cylinder 60B of the rear jib backstop 60 in accordance with rising of the boom 16 in the crane 1 in the embodiment.

The operator causes the boom raising and lowering winch 30 shown in FIG. 1 to wind up the boom raising and lowering rope 22 to raise the boom 16 from the state shown in FIG. 19. As a result, the boom head 16T of the boom 16, the lower jib 18A, and the strut 55 change their respective postures as shown in FIG. 20, FIG. 21, and FIG. 22. Here, the inner cylinder 60B of the rear jib backstop 60 moves relative to the outer cylinder 60A and the rear jib backstop 60 extends or contracts, while the fulcrum part 60S of the rear jib backstop 60 rotates about the first rotation central axis C1 and the distal end 60T thereof rotates about the second rotation central axis C2.

The spacer 70 hanging down with respect to the outer cylinder 60A of the rear jib backstop 60 via the spacer holder 80 in FIG. 20 and FIG. 21 is fitting onto the inner cylinder 60B from above under the weight of the spacer 70 (see FIG. 6 to FIG. 8) in response to such a change in the posture of the rear jib backstop 60 as to extend obliquely rearward as shown in FIG. 22. As a result, the spacer 70 keeps the rear jib backstop 60 from further contracting to maintain a preset posture of the strut 55 to the boom 16. The rear jib backstop 60 thus can prevent the strut 55 and the jib 18 from falling or being blown rearward in cooperation with the front jib backstop 61.

The above described sequence of steps is executed in a reverse manner for disassembling of the crane 1. In the disassembling, the boom 16 is lowered from the posture seen in FIG. 22, and at this time, the spacer 70 moves away from the inner cylinder 60B of the rear jib backstop 60 while swinging about the swing central axis CT under the weight of the spacer and returns to the posture (hanging posture) of hanging down from the spacer holder 80 at a position away from the inner cylinder 60B in a process of a change in the posture of the rear jib backstop 60 from a posture of extending obliquely rearward to a posture of extending obliquely frontward (FIG. 21) through a posture of extending perpendicularly upward.

As described above, in the embodiment, placing the lock mechanism 90 in the locking state permits the lock mechanism 90 (including the fastening pin P1 and the spring pin P2) to lock the spacer 70 to keep the spacer 70 from swinging about the swing central axis CT in the state where the spacer 70 is located away from the outer surface of the inner cylinder 60B. This keeps the spacer 70 from freely moving in disassembling of the crane 1 and in transportation of members including the rear jib backstop 60, and prevents the spacer 70 from coming into contact with a peripheral member. As a result, it is possible to prevent the spacer 70 and the peripheral member from being damaged. Therefore, the operator can proceed with disassembling and transportation of the crane 1 including the rear jib backstop 60 without the necessity of paying attention to the contact of the spacer 70 and a damage thereto, and thus can obtain improved operability. By contrast, in assembling of the crane 1, placing the lock mechanism 90 in the unlocking state permits the spacer 70 to swing so that the spacer 70 can restrict the length of the rear jib backstop 60.

In particular, in the embodiment, the spacer 70 does not have a perfect cylindrical shape but has a semi-cylindrical shape (is in a shape of a semi-cylinder) to be fittable on the outer surface of the inner cylinder 60B in a direction perpendicularly intersecting the axial direction of the rear jib backstop 60. This configuration eliminates the necessity of detaching the rear jib backstop 60 from the strut 55 for attaching the spacer 70 unlike the configuration in which another spacer having a perfect cylindrical shape is required to fit on the inner cylinder 60B in the axial direction, and hence achieves facilitated attachment and detachment of the spacer 70.

In the embodiment, the spacer holder 80 supports the spacer 70 swingably about the swing central axis CT in such a manner that the spacer 70 comes into the hanging posture in the boom lowered state and that the spacer 70 comes closer to the outer surface of the inner cylinder 60B along a perpendicular plane bearing the center line of the rear jib backstop 60 from the hanging posture when the boom 16 rises with respect to the upper slewing body 12 from the boom lowered state. The boom lowered state represents a state that the boom 16 is lowered to the upper slewing body 12 while supporting the strut 55. The hanging posture represents a posture of the spacer 70 to the outer cylinder 60A that the spacer 70 intersects the perpendicular plane and hangs down with respect to the outer cylinder 60A from the swing central axis CT under the weight of the spacer 70. The lock mechanism 90 locks the spacer 70 by connecting the spacer 70 and the outer cylinder 60A to each other in a facing posture of the spacer 70. The facing posture represents a posture of the spacer 70 with respect to the outer cylinder 60A that the outer surface of the spacer 70 faces the outer cylinder 60A after swinging of the spacer 70 further away from the outer surface of the inner cylinder 60B than in the hanging posture.

This configuration enables locking of the spacer 70 in a state of being located away from the inner cylinder 60B, and thus succeeds in keeping the spacer 70 from coming closer to the outer cylinder 60A and the inner cylinder 60B due to vibration in transportation. Further, the configuration achieves compactness of the rear jib backstop 60 more effectively than a configuration in which the spacer 70 is locked in a posture of extending in a direction substantially perpendicularly intersecting the center line of the rear jib backstop 60, and thus attains a smaller space occupied by the rear jib backstop 60 in transportation.

In the embodiment, the spacer holder 80 is attached to the outer cylinder 60A rotatably relative to the outer cylinder 60A in the circumferential direction, and the lock mechanism 90 locks the spacer 70 by connecting the spacer 70 and the outer cylinder 60A to each other in a state where the spacer 70 is located away from the perpendicular plane after rotation of the spacer holder 80 in the circumferential direction relative to the outer cylinder 60A in a state where the spacer 70 in the facing posture.

This configuration permits the spacer 70 to be located away from the perpendicular plane bearing the rear jib backstop 60 in a state of lying to be accommodated and face the outer cylinder 60A therealong, and thus prevents the spacer 70 from coming into contact with other member located above or under the rear jib backstop 60 in transportation.

In the embodiment, the lock mechanism 90 includes the fastening pin P1 or lock pin allowed to sequentially pass through the first pin hole 60HS and the second pin hole 70T to connect the spacer supported part 70B of the spacer 70 and the outer cylinder retainer 60H of the outer cylinder 60A to each other and lock the spacer 70 in a state where the spacer 70 is in the facing posture.

This configuration allows the fastening pin P1 to be inserted in the respective pin holes in the spacer supported part 70B and the outer cylinder retainer 60H to achieve easier locking of the spacer 70 in the facing posture.

In the embodiment, the outer cylinder retainer 60H is set at such a position as to allow the fastening pin P1 to pass through the first pin hole 60HS and the third pin hole 82S to connect the holder retainer 82 of the spacer holder 80 and the outer cylinder retainer 60H of the outer cylinder 60A to each other by the fastening pin P1, and allow the fastening pin P1 to restrict the spacer 70 in the circumferential direction of the outer cylinder 60A in the state where the spacer 70 is in the hanging posture.

This configuration easily keeps the spacer 70 from moving in the circumferential direction by connecting the holder retainer 82 and the outer cylinder retainer 60H by the fastening pin P1. This keeps the spacer 70 from being located away from the perpendicular plane bearing the center line of the rear jib backstop 60 in assembling of the crane 1, and prevents an occurrence of a failure in fitting of the spacer 70 on the inner cylinder 60B.

In the embodiment, the spacer holder 80 has the holder retainer 82 and the holder supporting part 83 at different positions in the circumferential direction. This arrangement enables shifting between a state where the spacer supported part 70B faces the outer cylinder retainer 60H and a state where the holder retainer 82 faces the outer cylinder retainer 60H in accordance with the rotation of the spacer holder 80 relative to the outer cylinder 60A. In other words, the arrangement enables shifting between a state where the fastening pin P1 is allowed to pass through the first pin hole 60HS and the second pin hole 70T and a state where the fastening pin P1 is allowed to pass through the first pin hole 60HS and the third pin hole 82S. Further, in other words, the arrangement enables the spacer 70 to shift between the hanging posture (fittable posture) thereof that the spacer 70 is fittable on the inner cylinder 60B and a posture (accommodation posture) that the spacer 70 is located away from the inner cylinder 60B to be in the facing posture of facing the outer cylinder 60A and is outside a space between the strut 55 and the outer cylinder 60A.

In the embodiment, the spacer holder 80 is set at such a rotation angle to the outer cylinder 60A in the circumferential direction as to allow the outer cylinder 60A to overlap the strut 55 in a location of the spacer 70 outside a space between the strut 55 and the rear jib backstop 60.

In this configuration, the spacer 70 located just under the inner cylinder 60B of the rear jib backstop 60 can restrict the length of the rear jib backstop 60 in working of the crane 1. By contrast, rotating of the spacer holder holding the spacer makes the rear jib backstop 60 and the strut 50 be integrally transportable in a state where the backstop is mounted on the strut for disassembling and transportation. In particular, the distal end 60T of the rear jib backstop 60 is attachable to the backstop holding part 55R of the strut 55 without disturbance of the spacer 70 when the rear jib backstop 60 is rotated about the fulcrum part 60S as a fulcrum to lie for accommodation. This succeeds in stably preventing the rear jib backstop 60 from falling off from the strut 55 in transportation.

Heretofore, the crane 1 including the rear jib backstop 60 (backstop) according to the embodiment of the present invention has been described. The present invention should not be limited to the embodiment. The present invention can cover the following modified embodiments.

(1) Although the rear jib backstop 60 that supports the strut 55 is described as a backstop to which the spacer 70 is attached in the embodiment, the present invention is applicable to a backstop included in other strut. In this case, the number of struts 55 is not limited to one, and the crane 1 may include two struts, e.g., a front strut and a rear strut. The strut 55 is not limited to one rotatably and pivotally supported at the jib proximal end 18P of the jib 18. The strut 55 may be pivotally and directly rotatably supported at the boom distal end 16Q or the boom head 16T of the boom 16. Even in the embodiment, the strut 55 is pivotally and indirectly rotatably supported at the boom distal end 16Q of the boom 16 via the jib proximal end 18P and the jib supporting part 161.

(2) Although the state where the spacer holder 80 is rotatable relative to the outer cylinder 60A is described in the embodiment, the spacer holder 80 may be fixedly attached to the outer cylinder 60A. In this case, the spacer holder 80 may be a part of the outer cylinder 60A.

(3) Although the crane 1 shown in FIG. 1 is used for the explanation in the embodiment, the present invention is not limited thereto and is applicable to a crane including a different structure. Specifically, a crane adopting the present invention may include a lattice mast or a box mast in place of the gantry 21.

The present invention provides a backstop that is to be attached to a crane including a machine body, a boom tiltably supported on the machine body, and a strut, the backstop being located between the boom and the strut for supporting the strut. The boom includes a boom proximal end and a boom distal end. The boom proximal end is rotatably attached to the machine body. The boom distal end is located opposite the boom proximal end and has a strut supporting part and a backstop supporting part located in the rear of the strut supporting part. The strut includes a strut proximal end, a strut distal end, and a backstop connection part. The strut proximal end is supported rotatably in a tilting direction about a reference rotation central axis extending horizontally by the strut supporting part at the boom distal end. The strut distal end is located opposite the strut proximal end. The backstop connection part is located between the strut proximal end and the strut distal end. The backstop includes an outer cylinder, an inner cylinder, a spacer, a spacer holder, and a lock mechanism. The outer cylinder includes an outer cylinder proximal end to be connected to the backstop connection part of the strut rotatably about a first rotation central axis being parallel to the reference rotation central axis, and an outer cylinder distal end located opposite the outer cylinder proximal end. The inner cylinder includes an inner cylinder proximal end to be supported by the backstop supporting part at the boom distal end rotatably about a second rotation central axis being parallel to the reference rotation central axis, and an inner cylinder distal end located opposite the inner cylinder proximal end to extend in the outer cylinder through the outer cylinder proximal end. The inner cylinder is movable relative to the outer cylinder in an axial direction to permit a change in a distance between the backstop supporting part and the backstop connection part in accordance with a rotation of the strut about the reference rotation central axis to the boom. The spacer has a predetermined dimension in the axial direction and a semi-cylindrical inner surface fittable on an outer surface of the inner cylinder in a direction perpendicularly intersecting the axial direction. The spacer has opposite ends in the axial direction respectively coming into contact with the outer cylinder distal end and the inner cylinder proximal end to keep the backstop from contracting in such a manner that the outer cylinder distal end comes closer to the inner cylinder proximal end than a distance corresponding to the dimension. The spacer holder is attached to the outer cylinder of the backstop for supporting the spacer swingably about a swing central axis perpendicularly intersecting the axial direction. The spacer holder supports the spacer in such a manner that the spacer swings about the swing central axis under the weight of the spacer to fit on the inner cylinder when the boom rises with respect to the machine body while supporting the strut. The lock mechanism is shiftable between a locking state of locking the spacer to keep the spacer from swinging about the swing central axis in a state where the spacer is located away from the outer surface of the inner cylinder and an unlocking state of permitting the spacer to swing about the swing central axis.

In this configuration, placing the lock mechanism in the locking state permits the lock mechanism to lock the spacer to keep the spacer from swinging about the swing central axis in the state where the spacer is located away from the outer surface of the inner cylinder. This keeps the spacer from freely moving in disassembling of the crane, and prevents the spacer from coming into contact with a peripheral member and being damaged due to the contact. Therefore, an operator can proceed with disassembling and transportation of the crane including the backstop without the necessity of paying attention to the contact of the spacer and a damage thereto. By contrast, in assembling of the crane, placing the lock mechanism in the unlocking state permits the spacer to swing so that the spacer can restrict the length of the rear jib backstop.

In this configuration, each of the outer cylinder and the inner cylinder preferably has a cylindrical shape having a center line extending in the axial direction. Preferably, the spacer holder supports the spacer swingably about the swing central axis in such a manner that the spacer comes into a hanging posture in a boom lowered state, and the spacer comes closer to the outer surface of the inner cylinder along a perpendicular plane bearing the center line of the outer cylinder from the hanging posture when the boom rises with respect to the machine body from the boom lowered state. The boom lowered state represents a state that the boom is lowered to the machine body while supporting the strut. The hanging posture represents a posture that the spacer intersects the perpendicular plane bearing the center line and hangs down from the swing central axis under the weight of the spacer. The lock mechanism preferably locks the spacer by connecting the spacer and the outer cylinder to each other in a facing posture of the spacer. The facing posture represents a posture of the spacer with respect to the outer cylinder that an outer surface of the spacer faces the outer cylinder after swinging of the spacer further away from the outer surface of the inner cylinder than in the hanging posture.

This configuration enables locking of the spacer in a state where the spacer is located away from the inner cylinder and faces the outer cylinder, and thus succeeds in keeping the spacer from coming closer to the inner cylinder due to vibration in transportation. Further, the configuration achieves compactness of the backstop more effectively than a configuration in which the lock mechanism locks the spacer in a posture of extending in a direction perpendicularly intersecting the center line of the jib backstop, and thus attains a smaller space occupied by the backstop in transportation.

In this configuration, preferably, the spacer holder is attached to the outer cylinder rotatably relative to the outer cylinder in a circumferential direction, and the lock mechanism locks the spacer by connecting the spacer and the outer cylinder to each other in a state where the spacer is located away from the perpendicular plane after rotation of the spacer holder in the circumferential direction relative to the outer cylinder in a state where the spacer is in the facing posture.

This configuration permits an operator to rotate the spacer holder relative to the outer cylinder so that the spacer moves away from the perpendicular plane bearing the backstop and lock the spacer, and thus succeeds in preventing the spacer from coming into contact with other member located above or under the backstop.

In the configuration, preferably, the outer cylinder has an outer cylinder main body having a cylindrical shape and an outer cylinder retainer, the outer cylinder main body including the outer cylinder proximal end and the outer cylinder distal end and being configured to support the spacer holder and receive the inner cylinder therein. The outer cylinder retainer is arranged on an outer surface of the outer cylinder main body at a position away from the spacer holder in view of the spacer in the hanging posture, and has a first pin hole in a direction perpendicularly intersecting the axial direction. The spacer preferably has a spacer main body having a semi-cylindrical shape and a spacer supported part. The spacer main body has an inner surface fittable on the outer surface of the inner cylinder. The spacer supported part extends from the spacer main body in the axial direction and is connected to the spacer holder swingably about the swing central axis, and has a second pin hole in a portion of the spacer supported part that is closer to the spacer main body than the swing central axis in a direction perpendicularly intersecting the axial direction. Preferably, the lock mechanism includes a lock pin, and the lock pin sequentially passes through the first pin hole and the second pin hole and connects the spacer supported part of the spacer and the outer cylinder retainer of the outer cylinder to each other to lock the spacer in a state where the spacer is in the facing posture.

This configuration permits an operator to insert the lock pin in the respective pin holes in the spacer supported part and the outer cylinder retainer to achieve easier locking of the spacer in the facing posture.

In the configuration, the spacer holder preferably has a holder cylindrical part, a holder supporting part, and a holder retainer. The holder cylindrical part fits on the outer surface of the outer cylinder rotatably relative to the outer cylinder in the circumferential direction. The holder supporting part is arranged on an outer surface of the holder cylindrical part for supporting the spacer supported part of the spacer swingably about the swing central axis. The holder retainer protrudes from the holder cylindrical part toward the outer cylinder proximal end at a position different from a position of the holder supporting part on the outer surface of the holder cylindrical part in the circumferential direction. The holder retainer has a third pin hole in a direction perpendicularly intersecting the axial direction. The outer cylinder retainer is set in such a position as to allow the lock pin to pass through the first pin hole and the third pin hole to connect the holder retainer of the spacer holder and the outer cylinder retainer of the outer cylinder to each other and allow the lock pin to restrict the spacer in the circumferential direction of the outer cylinder in the state where the spacer is in the hanging posture.

This configuration keeps the spacer from moving in the circumferential direction by connecting the holder retainer and the outer cylinder retainer by the lock pin. This keeps the spacer from being located away from the perpendicular plane bearing the center line of the backstop in assembling of the crane, and prevents an occurrence of a failure in fitting of the spacer on the inner cylinder.

In the configuration, the spacer holder is preferably set at such a rotation angle to the outer cylinder in the circumferential direction as to allow the outer cylinder to overlap the strut in a location of the spacer outside a space between the strut and the backstop.

In this configuration, for disassembling and transportation of the crane, the backstop and the strut are integrally carriable in a state where the backstop is mounted on the strut without an influence by the spacer.

The invention claimed is:

1. A backstop that is to be attached to a crane including a machine body, a boom tiltably supported on the machine body, and a strut, the boom including:

a boom proximal end rotatably attached to the machine body; and a boom distal end located opposite the boom proximal end and having a strut supporting part and a backstop supporting part located in the rear of the strut supporting part, the strut including: a strut proximal end supported rotatably in a tilting direction about a reference rotation central axis extending horizontally by the strut supporting part at the boom distal end; a strut distal end located opposite the strut proximal end; and a backstop connection part located between the strut proximal end and the strut distal end, the backstop being located between the boom and the strut for supporting the strut, the backstop comprising:

an outer cylinder including an outer cylinder proximal end to be connected to the backstop connection part of the strut rotatably about a first rotation central axis being parallel to the reference rotation central axis, and an outer cylinder distal end located opposite the outer cylinder proximal end;

an inner cylinder including an inner cylinder proximal end to be supported by the backstop supporting part at the boom distal end rotatably about a second rotation central axis being parallel to the reference rotation central axis, and an inner cylinder distal end located opposite the inner cylinder proximal end to extend in the outer cylinder through the outer cylinder proximal end, the inner cylinder being movable relative to the outer cylinder in an axial direction to permit a change in a distance between the backstop supporting part and the backstop connection part in accordance with a rotation of the strut about the reference rotation central axis to the boom;

a spacer having a predetermined dimension in the axial direction and a semi-cylindrical inner surface fittable on an outer surface of the inner cylinder in a direction perpendicularly intersecting the axial direction, the spacer having opposite ends in the axial direction respectively coming into contact with the outer cylinder distal end and the inner cylinder proximal end to keep the backstop from contracting in such a manner that the outer cylinder distal end comes closer to the inner cylinder proximal end than a distance corresponding to the dimension;

a spacer holder attached to the outer cylinder of the backstop for supporting the spacer swingably about a swing central axis perpendicularly intersecting the axial direction, the spacer holder supporting the spacer in such a manner that the spacer swings about the swing central axis under the weight of the spacer to fit on the inner cylinder when the boom rises with respect to the machine body while supporting the strut; and a lock mechanism that is shiftable between a locking state of locking the spacer to keep the spacer from swinging about the swing central axis in a state where the spacer is located away from the outer surface of the inner cylinder and an unlocking state of permitting the spacer to swing about the swing central axis.

2. The backstop according to claim 1, wherein each of the outer cylinder and the inner cylinder has a cylindrical shape having a center line extending in the axial direction, the spacer holder supports the spacer swingably about the swing central axis in such a manner that the spacer comes into a hanging posture of intersecting a perpendicular plane bearing the center line and hanging down with respect to the outer cylinder from the swing central axis under the weight of the spacer in a boom lowered state that the boom is lowered to the machine body while supporting the strut, and the spacer comes closer to the outer surface of the inner cylinder along the perpendicular plane from the hanging posture when the boom rises with respect to the machine body from the boom lowered state, and the lock mechanism locks the spacer by connecting the spacer and the outer cylinder to each other in a facing posture of the spacer with respect to the outer cylinder that an outer surface of the spacer faces the outer cylinder after swinging of the spacer further away from the outer surface of the inner cylinder than in the hanging posture.

3. The backstop according to claim 2, wherein the spacer holder is attached to the outer cylinder rotatably relative to the outer cylinder in a circumferential direction, and the lock mechanism locks the spacer by connecting the spacer and the outer cylinder to each other in a state where the spacer is located away from the perpendicular plane after rotation of the spacer holder in the circumferential direction relative to the outer cylinder in a state where the spacer is in the facing posture.

4. The backstop according to claim 3, wherein the outer cylinder has:

an outer cylinder main body including the outer cylinder proximal end and the outer cylinder distal end, and being configured to support the spacer holder and receive the inner cylinder therein; and an outer cylinder retainer arranged on an outer surface of the outer cylinder main body at a position away from the spacer holder in view of the spacer in the hanging posture, and having a first pin hole in a direction perpendicularly intersecting the axial direction, the spacer has:

a spacer main body having a semi-cylindrical shape and an inner surface fittable on the outer surface of the inner cylinder; and a spacer supported part extending from the spacer main body in the axial direction and connected to the spacer holder swingably about the swing central axis, and having a second pin hole in a portion of the spacer supported part that is closer to the spacer main body than the swing central axis in a direction perpendicularly intersecting the axial direction, and the lock mechanism includes a lock pin sequentially passing through the first pin hole and the second pin hole and connecting the spacer supported part of the spacer and the outer cylinder retainer of the outer cylinder to each other to lock the spacer in a state where the spacer is in the facing posture.

5. The backstop according to claim 4, wherein the spacer holder has:

a holder cylindrical part fitting on the outer surface of the outer cylinder rotatably relative to the outer cylinder in the circumferential direction;

a holder supporting part arranged on an outer surface of the holder cylindrical part for supporting the spacer supported part of the spacer swingably about the swing central axis; and a holder retainer protruding from the holder cylindrical part toward the outer cylinder proximal end at a position different from a position of the holder supporting part on the outer surface of the holder cylindrical part in the circumferential direction, and having a third pin hole in a direction perpendicularly intersecting the axial direction, and the outer cylinder retainer is set in such a position as to allow the lock pin to pass through the first pin hole and the third pin hole to connect the holder retainer of the spacer holder and the outer cylinder retainer of the outer cylinder to each other and allow the lock pin to restrict the spacer in the circumferential direction of the outer cylinder in the state where the spacer is in the hanging posture.

6. The backstop according to claim 3, wherein the spacer holder is set at such a rotation angle to the outer cylinder in the circumferential direction as to allow the outer cylinder to overlap the strut in a location of the spacer outside a space between the strut and the backstop.

* * * * *